US011413856B2

(12) United States Patent
El-Siblani et al.

(10) Patent No.: US 11,413,856 B2
(45) Date of Patent: Aug. 16, 2022

(54) METHOD OF MAKING THREE-DIMENSIONAL OBJECTS USING BOTH CONTINUOUS AND DISCONTINUOUS SOLIDIFICATION

(71) Applicant: Global Filtration Systems, Dearborn Heights, MI (US)

(72) Inventors: Ali El-Siblani, Dearborn Heights, MI (US); Mohamad Janbain, Oberhausen (DE)

(73) Assignee: Global Filtration Systems, Dearborn Heights, MI (US)

(*) Notice: Subject to any disclaimer, the term of this patent is extended or adjusted under 35 U.S.C. 154(b) by 46 days.

(21) Appl. No.: 16/920,509

(22) Filed: Jul. 3, 2020

(65) Prior Publication Data

US 2020/0331255 A1   Oct. 22, 2020

Related U.S. Application Data

(62) Division of application No. 15/404,307, filed on Jan. 12, 2017, now Pat. No. 10,737,479.

(51) Int. Cl.
*B29C 64/393* (2017.01)
*B33Y 10/00* (2015.01)
(Continued)

(52) U.S. Cl.
CPC ............ *B33Y 10/00* (2014.12); *B29C 64/129* (2017.08); *B29C 64/393* (2017.08); *B33Y 30/00* (2014.12); *B33Y 50/02* (2014.12)

(58) Field of Classification Search
CPC ... B29C 64/393; B29C 64/124; B29C 64/129; B29C 64/205; B29C 64/227;
(Continued)

(56) References Cited

U.S. PATENT DOCUMENTS

| 4,837,379 A | 6/1989 | Weinberg |
| 4,929,402 A | 5/1990 | Hull |

(Continued)

FOREIGN PATENT DOCUMENTS

| DE | 4105314 A1 | 8/1991 |
| DE | 4102257 A1 | 7/1992 |

(Continued)

OTHER PUBLICATIONS

Burns, "Automated Fabrication", Improving Productivity in Manufacturing, 1993, (ISBN 0-13-119462-3).

(Continued)

*Primary Examiner* — Joseph S Del Sole
*Assistant Examiner* — Jamel M Nelson
(74) *Attorney, Agent, or Firm* — Hansen IP Law PLLC

(57) ABSTRACT

A method and apparatus for making a three-dimensional object by solidifying a solidifiable material are shown and described. A photohardening inhibitor is admitted into a surface of a photohardenable material to create a "dead zone" where little or no solidification occurs. The dead zone prevents the exposed surface of the photohardenable material from solidifying in contact with a container bottom or film. As the solidified object areas get larger and the build platform speed increases, the dead zone increases which can cause the formation of channels in the resulting objects and delamination. A number of techniques including continuous/discontinuous mode switching, multiple illuminations of portions of the same layer, and the use of gray scaling are disclosed for regulating the size of the dead zone.

20 Claims, 16 Drawing Sheets

(51) Int. Cl.
   *B33Y 30/00* (2015.01)
   *B33Y 50/02* (2015.01)
   *B29C 64/129* (2017.01)

(58) Field of Classification Search
   CPC ... B29C 64/232; B29C 64/245; B29C 64/286; B29C 64/291; B33Y 10/00; B33Y 30/00
   See application file for complete search history.

(56) References Cited

U.S. PATENT DOCUMENTS

| | | | |
|---|---|---|---|
| 4,999,143 A | 3/1991 | Hull et al. | |
| 5,093,130 A | 3/1992 | Fujii et al. | |
| 5,122,441 A * | 6/1992 | Lawton | B29C 64/129 430/394 |
| 5,137,662 A | 8/1992 | Hull et al. | |
| 5,139,338 A | 8/1992 | Pomerantz | |
| 5,143,663 A | 9/1992 | Leyden et al. | |
| 5,157,423 A | 10/1992 | Zur | |
| 5,171,490 A | 12/1992 | Fudim | |
| 5,173,266 A | 12/1992 | Kenny | |
| 5,174,931 A | 12/1992 | Almquist et al. | |
| 5,175,077 A | 12/1992 | Grossa | |
| 5,236,637 A | 8/1993 | Hull | |
| 5,247,180 A | 9/1993 | Mitcham et al. | |
| 5,248,456 A | 9/1993 | Evans, Jr. et al. | |
| 5,263,130 A | 11/1993 | Pomerantz et al. | |
| 5,268,994 A | 12/1993 | Keskes | |
| 5,289,214 A | 2/1994 | Zur | |
| 5,298,208 A | 3/1994 | Sibley et al. | |
| 5,306,446 A | 4/1994 | Howe | |
| 5,345,391 A | 9/1994 | Hull et al. | |
| 5,360,981 A | 11/1994 | Owen et al. | |
| 5,391,072 A | 2/1995 | Lawton et al. | |
| 5,447,822 A | 9/1995 | Hull et al. | |
| 5,510,077 A | 4/1996 | Dinh et al. | |
| 5,529,473 A | 6/1996 | Lawton et al. | |
| 5,545,367 A | 8/1996 | Bae et al. | |
| 5,569,431 A | 10/1996 | Hull | |
| 5,571,471 A | 11/1996 | Hull | |
| 5,630,981 A | 5/1997 | Hull | |
| 5,651,934 A | 7/1997 | Almquist et al. | |
| 5,653,925 A | 8/1997 | Batchelder | |
| 5,823,778 A | 10/1998 | Schmitt et al. | |
| 5,858,746 A | 1/1999 | Hubbell et al. | |
| 5,891,382 A | 4/1999 | Almquist et al. | |
| 5,894,036 A | 4/1999 | Tylko | |
| 5,902,537 A | 5/1999 | Almquist et al. | |
| 5,945,058 A | 8/1999 | Manners et al. | |
| 5,980,813 A | 11/1999 | Narang et al. | |
| 6,013,099 A | 1/2000 | Dinh et al. | |
| 6,027,324 A | 2/2000 | Hull | |
| 6,048,487 A | 4/2000 | Almquist et al. | |
| 6,051,179 A | 4/2000 | Hagenau | |
| 6,153,034 A | 11/2000 | Lipsker | |
| 6,158,946 A | 12/2000 | Miyashita | |
| 6,171,610 B1 | 1/2001 | Vacanti et al. | |
| 6,280,727 B1 | 8/2001 | Prior et al. | |
| 6,281,903 B1 | 8/2001 | Martin et al. | |
| 6,334,865 B1 | 1/2002 | Redmond et al. | |
| 6,352,710 B2 | 3/2002 | Sawhney et al. | |
| 6,391,245 B1 | 5/2002 | Smith | |
| 6,500,378 B1 | 12/2002 | Smith | |
| 6,547,552 B1 | 4/2003 | Fudim | |
| 6,630,009 B2 | 10/2003 | Moussa et al. | |
| 6,764,636 B1 | 7/2004 | Allanic et al. | |
| 6,833,231 B2 | 12/2004 | Moussa et al. | |
| 6,833,234 B1 | 12/2004 | Bloomstein et al. | |
| 6,942,830 B2 | 9/2005 | Mulhaupt et al. | |
| 6,974,656 B2 | 12/2005 | Hinczewski | |
| 6,989,225 B2 | 1/2006 | Steinmann | |
| 7,052,263 B2 | 5/2006 | John | |
| 7,073,883 B2 | 7/2006 | Billow | |
| 7,467,939 B2 | 12/2008 | Sperry et al. | |
| 8,263,129 B2 | 9/2012 | DeSimone et al. | |
| 2001/0028495 A1 | 10/2001 | Quate et al. | |
| 2001/0048183 A1 | 12/2001 | Fujita | |
| 2003/0067539 A1 | 4/2003 | Doerfel et al. | |
| 2003/0074096 A1 | 4/2003 | Das et al. | |
| 2003/0205849 A1 | 11/2003 | Farnworth | |
| 2004/0008309 A1 | 1/2004 | Yamahara et al. | |
| 2005/0023710 A1 | 2/2005 | Bridkin et al. | |
| 2005/0208168 A1 | 9/2005 | Hickerson et al. | |
| 2005/0248061 A1 | 11/2005 | Shkolnik et al. | |
| 2005/0248062 A1 | 11/2005 | Shkolnik et al. | |
| 2005/0288813 A1 | 12/2005 | Yang et al. | |
| 2006/0078638 A1 | 4/2006 | Holmboe et al. | |
| 2006/0192312 A1 | 8/2006 | Wahlstrom | |
| 2006/0239588 A1 | 10/2006 | Hull et al. | |
| 2007/0074659 A1 | 4/2007 | Wahlstrom | |
| 2007/0075458 A1 | 4/2007 | Wahlstrom et al. | |
| 2007/0075459 A1 | 4/2007 | Reynolds et al. | |
| 2007/0075460 A1 | 4/2007 | Wahlstrom et al. | |
| 2007/0075461 A1 | 4/2007 | Hunter et al. | |
| 2007/0077323 A1 | 4/2007 | Stonesmith et al. | |
| 2007/0120842 A1 | 5/2007 | Hess | |
| 2007/0257055 A1 | 11/2007 | Scott et al. | |
| 2007/0259066 A1 | 11/2007 | Sperry et al. | |
| 2008/0038396 A1 | 2/2008 | John et al. | |
| 2008/0054531 A1 | 3/2008 | Kerekes et al. | |
| 2008/0169586 A1 | 7/2008 | Hull et al. | |
| 2008/0169589 A1 | 7/2008 | Sperry et al. | |
| 2008/0170112 A1 | 7/2008 | Hull et al. | |
| 2008/0179786 A1 | 7/2008 | Sperry et al. | |
| 2008/0179787 A1 | 7/2008 | Sperry et al. | |
| 2008/0181977 A1 | 7/2008 | Sperry et al. | |
| 2008/0206383 A1 | 8/2008 | Hull et al. | |
| 2008/0217818 A1 | 9/2008 | Holmboe et al. | |
| 2008/0226346 A1 | 9/2008 | Hull et al. | |
| 2008/0231731 A1 | 9/2008 | Hull et al. | |
| 2008/0309665 A1 | 12/2008 | Gregory, II et al. | |
| 2011/0089610 A1 | 4/2011 | El-Siblani | |
| 2015/0231831 A1 | 8/2015 | El-Siblani | |
| 2017/0173871 A1 * | 6/2017 | Ermoshkin | B29C 64/124 |

FOREIGN PATENT DOCUMENTS

| | | |
|---|---|---|
| DE | 4125534 A1 | 2/1993 |
| DE | 9319405 U1 | 3/1994 |
| DE | 19727554 A1 | 1/1997 |
| DE | 29911122 U1 | 9/1999 |
| DE | 19838797 A1 | 3/2000 |
| DE | 19929199 A1 | 1/2001 |
| DE | 10003374 C1 | 8/2001 |
| DE | 10018987 A1 | 10/2001 |
| DE | 20106887 U1 | 10/2001 |
| DE | 1250997 B1 | 10/2002 |
| DE | 4340108 C3 | 8/2003 |
| DE | 69909136 T2 | 5/2004 |
| EP | 0250121 A2 | 12/1987 |
| EP | 0466422 A1 | 1/1992 |
| EP | 0426363 A3 | 10/1993 |
| EP | 0435564 B1 | 4/1995 |
| EP | 0484086 B1 | 9/1995 |
| EP | 1250995 A1 | 10/2002 |
| EP | 1270185 A1 | 1/2003 |
| EP | 1192041 B1 | 3/2003 |
| EP | 1156922 B1 | 6/2003 |
| EP | 1338846 A2 | 8/2003 |
| EP | 1849587 B1 | 10/2007 |
| EP | 1880830 B1 | 1/2008 |
| EP | 1894704 A1 | 3/2008 |
| EP | 1950032 A2 | 7/2008 |
| EP | 1674243 B1 | 8/2008 |
| EP | 2011631 B1 | 1/2009 |
| FR | 2254194 A5 | 7/1975 |
| FR | 2692053 A | 12/1993 |
| JP | 04371829 A | 12/1992 |
| JP | 08192469 A | 7/1996 |
| WO | 9600422 A1 | 1/1996 |
| WO | 0100390 A1 | 1/2001 |
| WO | 200112679 A1 | 2/2001 |
| WO | 0114125 A1 | 3/2001 |
| WO | 0172501 A1 | 10/2001 |

(56) References Cited

FOREIGN PATENT DOCUMENTS

| WO | 2003059184 A3 | 7/2003 |
|---|---|---|
| WO | 2005110722 A1 | 11/2005 |
| WO | 2011086450 A2 | 7/2011 |
| WO | 2015195924 A1 | 12/2015 |

OTHER PUBLICATIONS

Stark, G.B., et al., "Biological Matrices and Tissue Reconstruction", Springer Publications, Berlin (1998).
Sachs, E., et al., "Three Dimensional Printing: Rapid Tooling and Prototypes Directly from CAD Model", Journal of Engineering for Industry, 114:481-488 (1992).
Kuhtreiber, W., Ph.D., et al., "Cell Encapsulation Technology and Therapeutics", Birkhauser, Boston (1998).
Wohlers Report 2000, "Rapid Prototyping & Tooling State of the Industry Annual Worldwide Progress report," T. Wohlers, Wohlers Association, Inc., Fort Collins, Colorado (2000).
Landers, R., and Mulhaupt, R., "Desktop Manufacturing of Complex Objects, Prototypes and Biomedical Scaffolds by Means of Computer-Assisted Design Combined with Computer-Guided 3D Plotting of Polymers and Reactive Oligomers," Macromolecular Materials and Engineering, 282:17-22 (2000).
Okada, T., and Ikada, Y., "Tissue Reactions to Subcutaneously Implanted, Surface-Modified Silicones," Journal of Biomedical Materials Research, 27:1509-1518 (1993).
Nikolaychik, V.V., et al., A New, Cryoprecipitate Based Coating for Improved Endothelial cell Attachment and Growth on Medical Grade Artificial Surfaces; ASAIO Journal, 40:M846-M852 (1994).
Relou, I.A., et al., "Effect of Culture Conditions on Endothelial Cell growth and Responsiveness," Tissue & Cell, 30 (5) :525-538 (1998).
English translation for DE 9319405U1, from Lexis Nexis Total Patent.
English translation for DE 10003374C1, from Lexis Nexis Total Patent.
English translation for EP 0426363A3, from Lexis Nexis Total Patent.
English translation for DE 19838797A1, from Lexis Nexis Total Patent.
English translation for DE 4102257A1, from Lexis Nexis Total Patent.
English translation for DE 4340108C3, from Lexis Nexis Total Patent.
English translation for DE 4105314A1, from Lexis Nexis Total Patent.
English translation for JP 08192469A, from Lexis Nexis Total Patent.
English translation for DE 10018987A1, from Lexis Nexis Total Patent.
English translation for DE 19727554A1, from Lexis Nexis Total Patent.
English translation for WO 0114125A1, from Lexis Nexis Total Patent.
English translation for JP 04371829A, from Lexis Nexis Total Patent.
English translation for DE 19929199A1, from Lexis Nexis Total Patent.
English translation for FR 2254194A5, from Lexis Nexis Total Patent.
English translation for DE 4125534A1, from Lexis Nexis Total Patent.
English translation for WO 0172501A1, from Lexis Nexis Total Patent.
English translation for EP 1849587A1, from Lexis Nexis Total Patent.
English translation for WO 0112679A1, from Lexis Nexis Total Patent.
English translation for DE 20106887U1, from Lexis Nexis Total Patent.
English translation for FR 2696053A1, from Lexis Nexis Total Patent.
English translation for WO 2005110722A1, from Lexis Nexis Total Patent.
English translation for WO 0100390A1, from Lexis Nexis Total Patent.
English translation for EP 1192041B1, from Lexis Nexis Total Patent.
English translation for EP 1250997A1, from Lexis Nexis Total Patent.
English translation for DE 69909136T2, from Lexis Nexis Total Patent.
English translation for DE 29911122U1, from Lexis Nexis Total Patent.
Third Party Submission with Concise Description of Relevance for Fricke, PCT Application Publication No. WO 01/72501 as-filed on Jun. 8, 2015.
Third Party Submission with Concise Description of Relevance for Lawton, U.S. Pat. No. 5,122,441 as-filed on Jun. 8, 2015.
Third Party Submission with Concise Description of Relevance for Zenere, PCT Application Publication No. WO 2011/086450 as-filed on Jul. 15, 2015.
Third Party Submission with Concise Description of Relevance for El-Siblani, U.S. Patent Application Publication No. 2011/0089610 as-filed on Aug. 10, 2015.
Third Party Submission with Concise Description of Relevance for Yasuda et al., J. Polymer Sci., vol. 4 at 1314-1316 (1966).
Third Party Submission with Concise Description of Relevance for Stern, J. Polymer Sci., vol. 6 Part A-2 at 1933-1934 (1968).
Opposition to: EP 1 849 587 dated Apr. 8, 2010.
International Search Report and Written Opinion for PCT/US2018/013229 dated Apr. 4, 2018.

* cited by examiner

| Region Surface Area ($S_{ai}$) | $0 < A_i \leq A_1$ | $A_1 < A_i \leq A_2$ | | | | $A_i > A_2$ | | | |
|---|---|---|---|---|---|---|---|---|---|
| Region Inverse Slenderness $G'_i$ | Any Value | $0 < G'_i \leq G'_1$ | $G'_i > G'_1$ | | $0 < G'_i \leq G'_2$ | $G'_2 < G'_i \leq G'_3$ | $G'_i > G'_3$ | |
| Region Void Ratio | Any Value | Any Value | $0 < R_i \leq R_1$ | $R_i > R_1$ | Any Value | Any Value | $0 < R_1 \leq R_2$ | $R_i > R_2$ |
| Region Delay Time $t_{di}$ | 0 | 0 | $t_{di}(1)$ | 0 | $t_{di}(2)$ | $t_{di}(3)$ | $t_{di}(4)$ | 0 |

FIG. 13

| Region Surface Area ($S_{ai}$) (mm$^2$) | $0 < A_i \leq 10$ | $10 < A_i \leq 120$ | | | | $A_i > 120$ | | | |
|---|---|---|---|---|---|---|---|---|---|
| Region Inverse Slenderness $G'_i$ | $G'_i > 0$ | $G'_i \leq 1.8$ | $G'_i > 1.8$ | | $G'_i \leq 1.5$ | $1.5 < G'_i \leq 2$ | $G'_i > 2$ | |
| Region Void Ratio $R_i$ | $R_i > 0$ | $R_i > 0$ | $0 < R_i \leq 0.5$ | $R_i > 0.5$ | $R_i > 0$ | $R_i > 0$ | $R_i \leq 0.5$ |
| Region Platform Speed (mm/sec) | 0.05mm/6 sec=0.08333 | 0.05mm/9 sec=0.005555 | 0.05mm/9 sec=0.005555 | 0.05mm/6 sec=0.08333 | 0.05mm/12 sec=0.0041667 | 0.05mm/10 sec=0.005 | 0.05mm/9 sec=0.005556 |

FIG. 15A

Speed = 0.008333 mm/sec

| Region Surface Area ($S_{ai}$) (mm²) | $0 < A_i \leq 10$ | $10 < A_i \leq 120$ | | | | $A_i > 120$ | | |
|---|---|---|---|---|---|---|---|---|
| Region Inverse Slenderness $G'_i$ | $G'_i > 0$ | $G'_i \leq 1.8$ | $G'_i > 1.8$ | | | $G'_i \leq 1.5$ | $1.5 < G'_i \leq 2$ | $G'_i > 2$ |
| Region Void Ratio $R_i$ | $R_i > 0$ | $R_i > 0$ | $R_i \leq 0.5$ | $R_i > 0.5$ | | $R_i > 0$ | $R_i > 0$ | $R_i \leq 0.5$ |
| Gray Scale (0-255) | 150 | 195 | 195 | 150 | | 250 | 223 | 195 |

FIG. 15B

Speed = 0.005555 mm/sec

| Region Surface Area ($S_{ai}$) (mm²) | $0 < A_i \leq 10$ | $10 < A_i \leq 120$ | | | | $A_i > 120$ | | |
|---|---|---|---|---|---|---|---|---|
| Region Inverse Slenderness $G'_i$ | $G'_i > 0$ | $G'_i \leq 1.8$ | $G'_i > 1.8$ | | $G'_i \leq 1.5$ | $1.5 < G'_i \leq 2$ | $G'_i > 2$ |
| Region Void Ratio $R_i$ | $R_i > 0$ | $R_i > 0$ | $R_i \leq 0.5$ | $R_i > 0.5$ | $R_i > 0$ | $R_i > 0$ | $R_i \leq 0.5$ |
| Gray Scale (0-255) | 135 | 178 | 178 | 135 | 235 | 210 | 178 |

FIG. 15C

Speed = 0.0041666 mm/sec

| Region Surface Area ($S_{ai}$) (mm2) | $0 < A_i \leq 10$ | $10 < A_i \leq 120$ | | | | $A_i > 120$ | | |
|---|---|---|---|---|---|---|---|---|
| Region Inverse Slenderness $G'_i$ | $G'_i > 0$ | $G'_i \leq 1.8$ | $G'_i > 1.8$ | | | $G'_i \leq 1.5$ | $1.5 < G'_i \leq 2$ | $G'_i > 2$ |
| Region Void Ratio $R_i$ | $R_i > 0$ | $R_i > 0$ | $R_i \leq 0.5$ | $R_i > 0.5$ | | $R_i > 0$ | $R_i > 0$ | $R_i \leq 0.5$ |
| Gray Scale (0-255) | 82 | 115 | 115 | 82 | | 138 | 127 | 115 |

FIG. 15D

METHOD OF MAKING THREE-DIMENSIONAL OBJECTS USING BOTH CONTINUOUS AND DISCONTINUOUS SOLIDIFICATION

CROSS REFERENCE TO RELATED APPLICATIONS

This application is a divisional of U.S. patent application Ser. No. 15/404,307, filed Jan. 12, 2017, the entirety of which is hereby incorporated by reference.

FIELD

The disclosure relates to a system and method for manufacturing three-dimensional objects, and more specifically, to a system and method in which the build platform movement and exposures to solidification energy are carried out continuously and discontinuously at different times.

DESCRIPTION OF THE RELATED ART

Three-dimensional rapid prototyping and manufacturing allows for quick and accurate production of components at high accuracy. Machining steps may be reduced or eliminated using such techniques and certain components may be functionally equivalent to their regular production counterparts depending on the materials used for production.

The components produced may range in size from small to large parts. The manufacture of parts may be based on various technologies including photo-polymer hardening using light or laser curing methods. Secondary curing may take place with exposure to, for example, ultraviolet (UV) light. A process to convert a computer aided design (CAD) data to a data model suitable for rapid manufacturing may be used to produce data suitable for constructing the component. Then, a pattern generator may be used to construct the part. An example of a pattern generator may include the use of DLP (Digital Light Processing technology) from Texas Instruments®, SXRD™ (Silicon X-tal Reflective Display), LCD (Liquid Crystal Display), LCOS (Liquid Crystal on Silicon), DMD (digital mirror device), J-ILA from JVC, SLM (Spatial light modulator) or any type of selective light modulation system.

In certain three-dimensional object manufacturing processes, it is important to ensure that the solidifiable material (e.g., polymeric resin) used to make the object forms a smooth and substantially planar surface to which solidification energy from a pattern generator will be applied. One technique uses an "upside down" build process in which an object is built progressively in the downward build (z) axis direction (toward the earth) as the build platform is progressively elevated in the upward build (z) axis direction. A basin holding the solidifiable material, such as a photohardenable material, has a transparent bottom through which patterns of solidification energy are projected to solidify the photohardenable material in patterns corresponding to cross-sections of the three-dimensional object. However, because the solidification energy is incident at the bottom of the basin, photohardenable material solidifies in contact with the basin and must be separated without damaging the object.

Certain known methods involve the creation of a "dead zone"—where no solidification occurs—in a thin region at the interface between the photohardenable material and the bottom of the basin. These methods avoid the need for a means to separate the solidified object from the bottom of the basin. The methods typically involve feeding a photo-hardening inhibitor to the thin region. The inhibitor typically reacts with or consumes a polymerization initiator such that polymerization cannot occur within the thin region. The inhibitor is fed at a rate that affects the thickness of the dead zone. Because no separation step is required, some of the methods move the build platform continuously upward along the build axis to accelerate the build process. However, for objects having certain cross-sectional areas, the speed at which the build platform may be elevated is constrained by the speed at which solidifiable material fills the gap left by the solidified material used to form the most recent layer. As the solidifiable material flows faster into the gap, a pressure drop between the inhibitor and the periphery of the partially formed object increases, causing the flow rate of the inhibitor to the periphery to increase. This in turn increases the build (z) axis thickness of the dead zone. The expansion of the dead zone in the manner can cause channels to form in the part, and eventually, delamination of the object. Thus, a need has arisen for a system and method of making three-dimensional objects which addresses the foregoing issues.

BRIEF DESCRIPTION OF THE DRAWINGS

The disclosure will now be described, by way of example, with reference to the accompanying drawings, in which:

FIG. 13 is a table used to illustrate a method of determining a dead time used in a method of making a three-dimensional object;

FIG. 15A is a table used to illustrate a method of determining a build platform speed in a method of making a three-dimensional object; and FIGS. 15B-15D are tables used to illustrate a method of determining gray scale value contributions to total gray scale values for maintaining a dead zone height in a method of making a three-dimensional object.

DETAILED DESCRIPTION

Figure 1A:
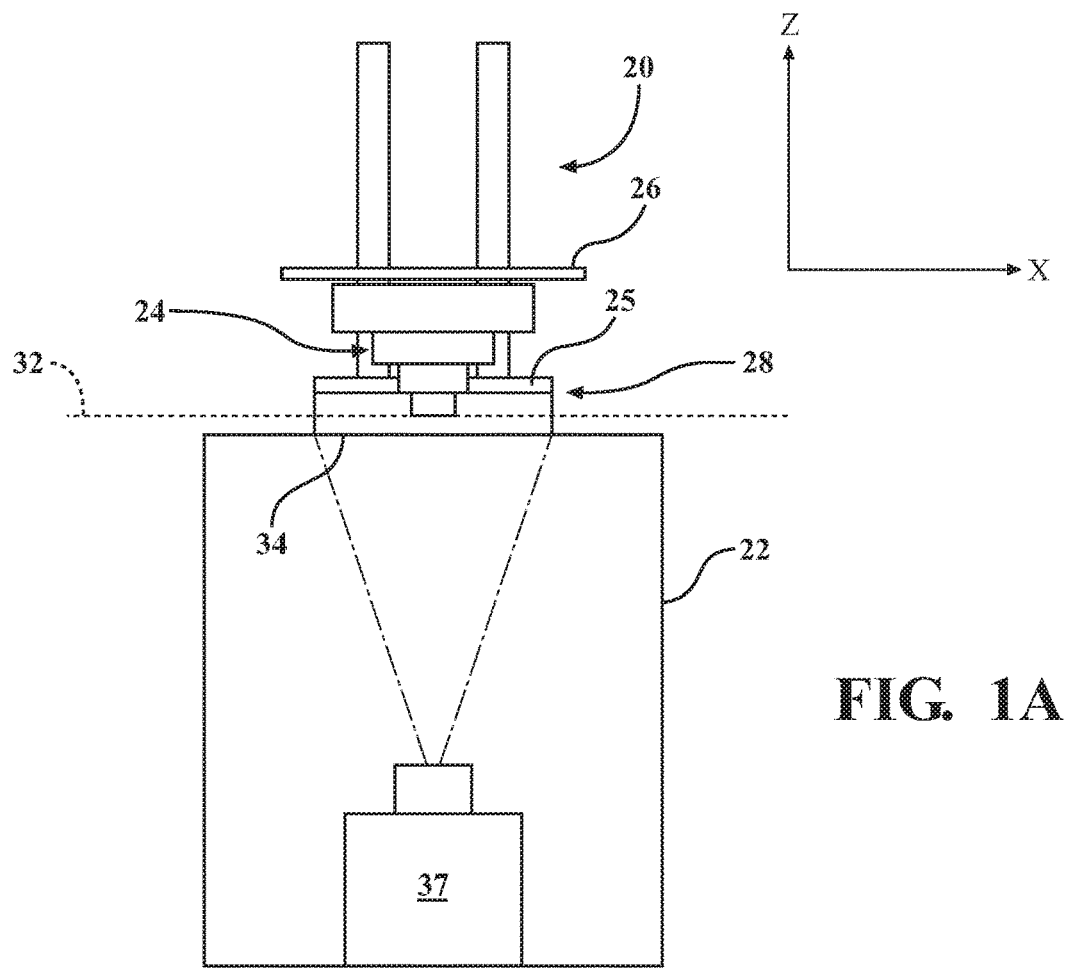
FIG. 1A is a side elevational, cross-sectional view of system for making a three-dimensional object from a solidifiable material in accordance with the present disclosure.

The Figures illustrate examples of a system and method for manufacturing. Based on the foregoing, it is to be generally understood that the nomenclature used herein is simply for convenience and the terms used to describe the invention should be given the broadest meaning by one of ordinary skill in the art.

The system and methods described herein are generally applicable to additive manufacturing of three-dimensional objects, such as components or parts (discussed herein generally as objects), but may be used beyond that scope for alternative applications. The system and methods generally involve creating a "dead zone" of non-solidification in a photohardenable material to prevent the material from solidifying against a surface of a photohardenable material container. Various techniques are described below to prevent the excessive expansion of the dead zone along the build (z) axis. In one method, sets of continuous and discontinuous solidification energy image exposure periods are alternated. In another method, select portions of an object layer are exposed to solidification energy multiple times to achieve the required layer thickness. In another method, the intensity of solidification energy is varied between select areas of an object to achieve the required layer thickness.

In accordance with a first aspect of the present disclosure, a method of making a three-dimensional object by projecting solidification energy images onto a photohardenable material that solidifies on a build platform is provided. The method comprises admitting a photohardening inhibitor through a surface of the photohardenable material, continuously moving the build platform along a build axis away from the surface during each period in a first set of consecutive periods, and discontinuously moving the build platform along the build axis away from the surface during a second set of consecutive periods. During the first set of consecutive periods, an uninterrupted series of image exposures are sequentially performed onto the surface, each image being representative of a corresponding cross-section of the three-dimensional object. During the second set of consecutive periods, a series of image exposures are sequentially performed onto the surface, and the build platform does not move during any of the image exposures and moves away from the surface when no image exposure is occurring.

In certain examples, the continuous movement and discontinuous movement steps are carried out in an alternating sequence. In certain examples, the method is carried out when a single largest cross-sectional area of the three-dimensional object exceeds a selected value. In other examples, the frequency of alternating between continuous and discontinuous movement is dependent on the value of the single largest cross-sectional area in the three-dimensional object. In other examples the number of consecutive exposure periods in the first set and the second set may be the same or different.

In accordance with another aspect of the present disclosure, a method of making a three-dimensional object by projecting solidification energy onto a photohardenable material that solidifies on a build platform is provided. The method comprises alternating between sets of continuous solidification energy image exposure periods and sets of discontinuous solidification energy exposure periods. During each set of continuous solidification energy image exposure periods, solidification energy images corresponding to cross-sections of the three-dimensional object are continuously projected onto a surface of the photohardenable material as the build platform continuously moves through a distance along a build axis corresponding to a selected number of object layers, and during each set of discontinuous solidification energy exposure periods, the build platform discontinuously moves along the build axis, and solidification energy images corresponding to cross-sections of the three-dimensional object are discontinuously projected onto the surface of the photohardenable material to solidify the selected number of layers only when the build platform is stationary along the build axis. In certain examples, the method is carried out when a single largest cross-sectional area of the three-dimensional object exceeds a selected value. In other examples, the frequency of alternating between continuous and discontinuous sets of solidification energy exposure periods is dependent on the value of the single largest cross-sectional area in the three-dimensional object.

In accordance with still another aspect of the present disclosure, a method of making a three-dimensional object by solidifying a solidifiable material on a build platform is provided. The method comprises providing a first set of object data defining a layer of the three-dimensional object, providing a second set of object data that is a sub-set of the first set of object data, supplying a first pattern of solidification energy corresponding to the first set of object data for a first exposure time to a building region in the solidifiable material while the build platform moves along a build axis, wherein the first pattern of solidification energy passes through a dead zone in the solidifiable material in which no solidification takes place. The method also comprises supplying a second pattern of solidification energy corresponding to the second set of object data for a second exposure time to the building region, wherein the second pattern of solidification energy passes through the dead zone.

In accordance with yet another aspect of the present disclosure, a method of making a three-dimensional object by solidifying a solidifiable material is provided. The method comprises providing sets of object data, each set corresponding to a layer of the object, solidifying a plurality of layers of the solidifiable material in accordance with a corresponding set of the object data to form the three-dimensional object on a build platform, wherein the build platform continuously moves along the build axis during the step of solidifying each of the layers of the plurality of layers, and wherein during the solidification of each layer in the plurality of layers, a first set of independent continuous regions of the layer meeting a first specified surface area criterion, a first specified slenderness criterion, and a first specified inner void area to outer contour area ratio criterion are supplied with solidification energy corresponding to a first gray scale value, and a second set of independent continuous regions meeting a second specified surface area criterion, a second specified slenderness criterion, and a second specified inner void area to outer contour area ratio criterion, are supplied with solidification energy corresponding to a second gray scale value.

In accordance with a further aspect of the present disclosure, a method of making a three-dimensional object by solidifying a solidifiable material is provided which comprises providing object data for a plurality of layers of the three-dimensional object, wherein the object data for each layer defines one or more independent continuous regions of the object, selecting a desired layer thickness for each layer, determining a maximum longest minimum path for each independent continuous region in each layer, determining a maximum longest minimum path for each layer from the longest minimum path ("LMP") for each independent continuous region in the layer, and determining a dead time for each layer based on the maximum longest minimum path for each layer, determining at least one exposure time for each layer, each exposure time corresponding to one or more continuous regions of the layer. The method further comprises solidifying each layer in the plurality of layers of the solidifiable material to form a corresponding layer of the plurality of layers of the three-dimensional object by moving a build platform along a build axis for the layer's dead time, wherein no solidification of the solidifiable material takes place during the dead time, continuing to move the build platform along the build axis while projecting a sequence of patterns of solidification energy onto the solidifiable material, each pattern corresponding to one of the at least one exposure time, wherein the sequence progresses from a first pattern corresponding to all of the independent continuous regions to a last pattern corresponding to one of the one or more independent continuous regions that has the longest minimum path greater than the others of the one or more independent continuous regions.

The system is generally used for manufacturing three-dimensional objects from a solidifiable material and rapid prototyping. A pattern generator (such as a digital light projector, laser, LCD, LED array, etc.) provides an image to the solidifiable material to selectively solidify it.

As discussed herein, a solidifiable material is a material that when subjected to energy, wholly or partially hardens. This reaction to solidification or partial solidification may be used as the basis for constructing the three-dimensional object. Examples of a solidifiable material may include a polymerizable or cross-linkable material, a photopolymer, a photo powder, a photo paste, or a photosensitive composite that contains any kind of ceramic based powder such as aluminum oxide or zirconium oxide or ytteria stabilized zirconium oxide, a curable silicone composition, silica based nano-particles or nano-composites. The solidifiable material may further include fillers. Moreover, the solidifiable material may take on a final form (e.g., after exposure to the electromagnetic radiation) that may vary from semi-solids, solids, waxes, and crystalline solids. A photohardenable material is a material that—when subjected to electromagnetic energy of a particular intensity and for a particular duration—hardens through polymerization and/or cross-linking (curing)

When discussing a photopolymerizable, photocurable, or solidifiable material, any material is meant, possibly comprising a resin and optionally further components, which is solidifiable by means of supply of stimulating energy such as electromagnetic radiation. Suitably, a material that is polymerizable and/or cross-linkable (i.e., curable) by electromagnetic radiation (common wavelengths in use today include UV radiation and/or visible light) can be used as such material. In an example, a material comprising a resin formed from at least one ethylenically unsaturated compound (including but not limited to (meth)acrylate monomers and polymers) and/or at least one epoxy group-containing compound may be used. Suitable other components of the solidifiable material include, for example, inorganic and/or organic fillers, coloring substances, viscose-controlling agents, etc., but are not limited thereto.

When photopolymers are used as the solidifiable material, a photoinitiator is typically provided. The photoinitiator absorbs light and generates free radicals which start the polymerization and/or crosslinking process. Suitable types of photoinitiators include metallocenes, 1, 2 di-ketones, acylphosphine oxides, benzyldimethyl-ketals, α-amino ketones, and α-hydroxy ketones. Examples of suitable metallocenes include Bis (eta 5-2, 4-cyclopenadien-1-yl) Bis [2,6-difluoro-3-(1H-pyrrol-1-yl) phenyl] titanium, such as Irgacure 784, which is supplied by Ciba Specialty chemicals. Examples of suitable 1,2 di-ketones include quinones such as camphorquinone. Examples of suitable acylphosphine oxides include bis acyl phosphine oxide (BAPO), which is supplied under the name Irgacure 819, and mono acyl phosphine oxide (MAPO) which is supplied under the name Darocur® TPO. Both Irgacure 819 and Darocur® TPO are supplied by Ciba Specialty Chemicals. Examples of suitable benzyldimethyl ketals include alpha, alpha-dimethoxy-alpha-phenylacetophenone, which is supplied under the name Irgacure 651. Suitable α-amino ketones include 2-benzyl-2-(dimethylamino)-1-[4-(4-morpholinyl) phenyl]-1-butanone, which is supplied under the name Irgacure 369. Suitable α-hydroxy ketones include 1-hydroxy-cyclohexyl-phenyl-ketone, which is supplied under the name Irgacure 184 and a 50-50 (by weight) mixture of 1-hydroxy-cyclohexyl-phenyl-ketone and benzophenone, which is supplied under the name Irgacure 500.

The pattern generator(s) may be configured in a number of ways. Many may provide controlled electromagnetic radiation to provide a desired pattern. The electromagnetic radiation may include actinic light, visible or invisible light, UV-radiation, IR-radiation, electron beam radiation, X-ray radiation, laser radiation, or the like. Moreover, while each type of electromagnetic radiation in the electromagnetic spectrum may be discussed generally, the disclosure is not limited to the specific examples provided. Those of skill in the art are aware that variations on the type of electromagnetic radiation and the methods of generating the electromagnetic radiation may be determined based on the needs of the application.

Referring to FIG. 1A, a system 20 for making a three-dimensional object 24 from a photohardenable material 25 is depicted. System 20 is generally configured to receive data describing the shape and appearance of the object (such as CAD data) and to create a solid object 24 in conformity with the data. System 20 includes a housing 22 in which a pattern generator 37 is disposed. Pattern generator 37 projects two-dimensional solidification energy images upward along a build (z) axis and through an opening 34 in the top of housing 22. Photohardenable material 25 is a material that when subjected to electromagnetic energy of a particular intensity and for a particular duration hardens through polymerization and/or cross-linking (curing). Each image projected by pattern generator 37 corresponds to a cross-section of three-dimensional object 24. The photohardenable material 25 is held in a container 28 with a transparent bottom. The container 28 is positioned over opening 34 in the top of housing 22 so that electromagnetic energy (such as UV, IR or visible light) can enter the container 28. At least one process computer is operatively connected to the pattern generator 37 and a build platform actuator (not shown) to provide image data to the pattern generator 37 to move the build platform 26 along the build (z) axis. One of the process computers or another computer may be provided to convert image data from one format (e.g., .stl files) to another suitable for use by the pattern generator (e.g., bitmaps).

Solidification of the photohardenable material 25 occurs in a building region that begins at a build plane 32. Build plane 32 is defined by a dead zone 41 (FIGS. 2-4) which is a region into which solidification energy penetrates but in which the photohardenable material 25 does not harden. In certain examples, the dead zone 41 is created by feeding a photohardening inhibitor 47 into the container 28 or a portion thereof which holds the photohardenable material 25. In the same or other cases, the temperature of the dead zone 41 is controlled to inhibit polymerization.

Figure 2:
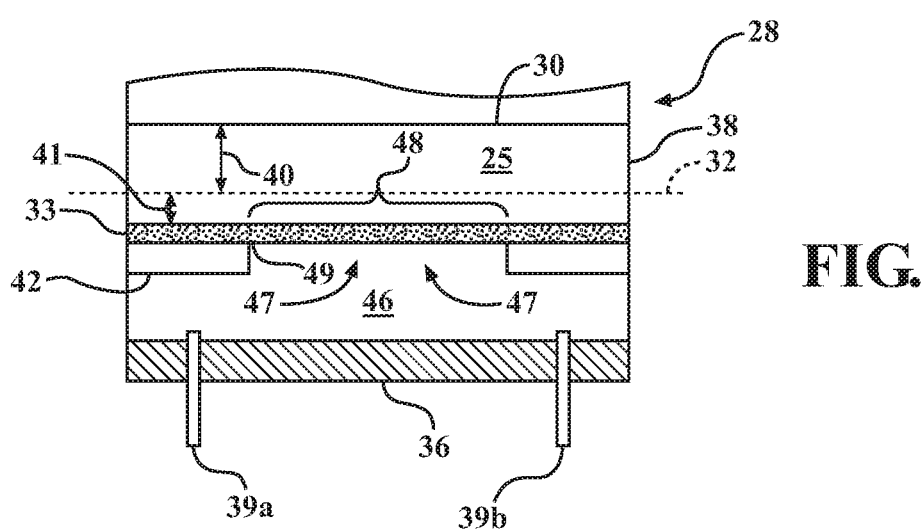
FIG. 2 is a close-up cross-sectional view of a first example of a photohardenable material basin for use in the system of FIG. 1A.

The container 28 may be structured in a number of different ways. One exemplary configuration is shown in FIG. 2. Container 28 includes a transparent bottom 36 comprising a rigid or semi-rigid material such as a glass or plastic. Inhibitor permeable film 33 defines a transparent surface that is permeable to the photohardening inhibitor and is spaced apart from the bottom 36 along the build (z) axis. The photohardenable material 25 is above and in contact with inhibitor permeable film 33. The inhibitor permeable film 33 is attached to the sides of frame 38 which defines the side walls of the container 28. Film 33 sits on a central flange 49 that defines a central opening 48. Flange 49 projects upward from shelf 42. A chamber 46 is defined between film 33 and transparent bottom 36. The chamber 46 acts as a reservoir of the photohardening inhibitor 47 and has an internal pressure that may be regulated by the flow of inhibitor 47 into the container and/or the speed of movement of the build platform 26 away from the build plane 32. Inhibitor inlets 39a and 39b are connected to a source of the inhibitor 47. The inhibitor 47 is preferably selected to be reactive with and consume a polymerization initiator in photohardenable material 25. Exemplary inhibitors 47 include oxygen and air. The inhibitor enters chamber 46 through inlets 39a and 39b and permeates inhibitor permeable film 33 through central opening 48 to contact the exposed (lower) surface 27 of photohardenable material 25 which is in contact with film 33. The flowrate of the inhibitor 47 entering ports 39a and 39b is preferably selected to maintain a desired dead zone 41 thickness along the build (z) axis. As shown in FIG. 2, build plane 32 is spaced apart from inhibitor permeable film 33 along the build (z) axis by a distance that defines the thickness of dead zone 41. When solidification energy is projected from pattern generator 37, solidification begins at the build plane 32 and does not occur in dead zone 41.

The inhibitor permeable film 33 may have a tendency to droop within window 48. In some implementations, a displacement detector is provided which tracks the build (z) axis position of a point (e.g., center point "C") on film 33 within window 48. A feedback control system may be implemented which adjusts the flow rate or pressure of the inhibitor 47 entering or exiting inhibitor ports 39a and 39b to control the position of center point "C". The immersion depth 40 is the build (z) axis thickness between the upward facing, exposed surface 30 of the photohardenable material and the build plane 32. The immersion depth 40 is the depth to which the most recently formed, downward-facing surface of object 24 is immersed in the unsolidified, photohardenable material 25. In other examples, the displacement of the film 33 is controlled by adjusting the upward speed of movement of the build platform 26 along the build (z) axis. In further examples, the flow rate or pressure of the inhibitor 47 on one hand and the build platform 26 speed on the other hand are used to control the displacement of the center point C of film 33. For example, a split range control system may be used in which the inhibitor pressure in the chamber 46 (FIGS. 1B, 1C, and 2) is adjusted to control the film displacement until it reaches a high limit, and then the build platform 26 speed may be adjusted to control the film 33 displacement as needed once the inhibitor pressure limit is reached.

Figure 3:
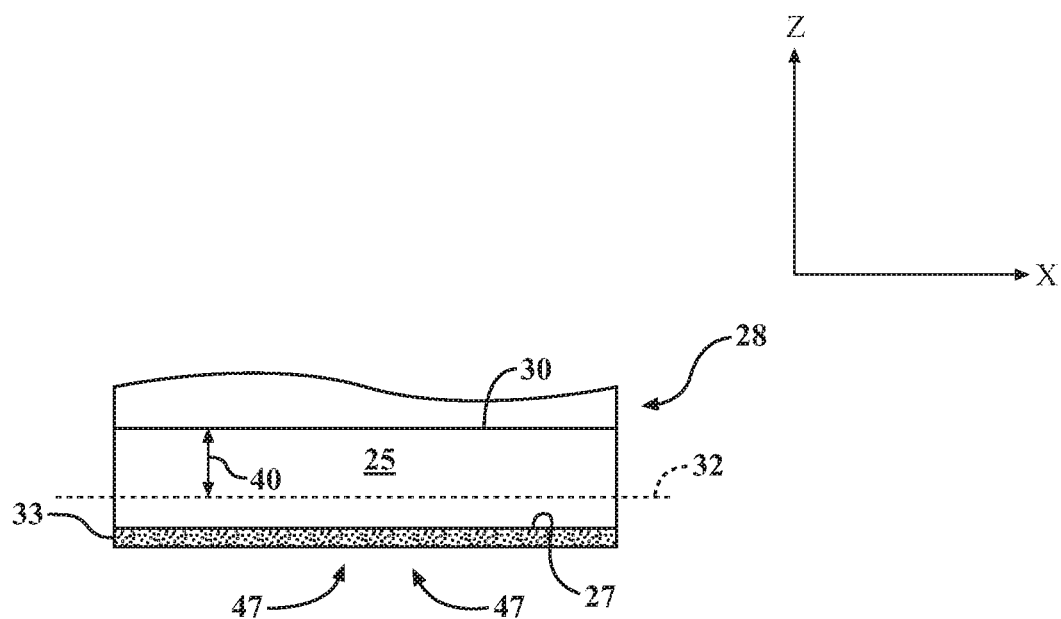
FIG. 3 is a close-up cross-sectional view of a second example of a photohardenable material basin for use in the system of FIG. 1A.

Referring to FIG. 3, another example of container 28 is provided. In this example, container 28 comprises sidewalls 38 that define a frame which holds inhibitor permeable film 33 in place. Inhibitor permeable film 33 defines the bottom 36 of container 28. Inhibitor 47 flows through inhibitor permeable film 33 and into the photohardenable material to create dead zone 41 which is defined between build plane 32 and inhibitor permeable film 33. The temperature of dead zone 41 may also be adjusted to prevent solidification from occurring in dead zone 41.

Figure 4:
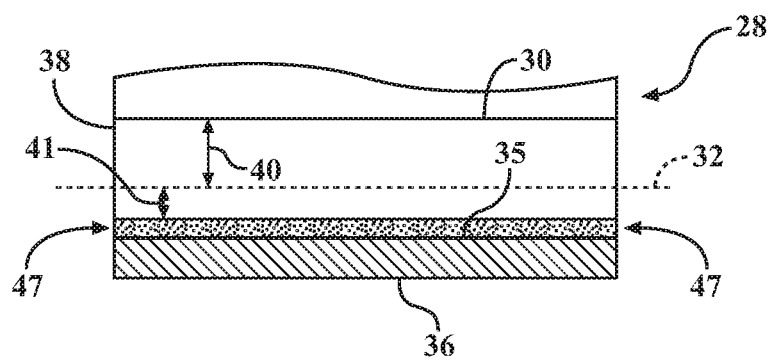
FIG. 4 is a close-up cross-sectional view of a third example of a photohardenable material basin for use in the system of FIG. 1A.

Referring to FIG. 4, another example of a photohardenable material container 28 is provided. In this example, the container 28 bottom is defined by a transparent rigid or semi-rigid panel 36 to which a transparent microfluidic PDMS (polydimethylsiloxane) 35 is laminated. The inhibitor 47 (e.g., air or oxygen) enters the microfluidic PDMS 35 at the sides (the thickness dimension) and then is transported upward along the build (z) axis into the photohardenable material 25. In this example and in those of FIGS. 2 and 3, the transparent rigid or semi-rigid solidification panel 36 is impermeable to the inhibitor 47 (unless inlet ports are provided such as ports 39a and 39b in FIG. 2).

Regardless of which container 28 is used, in each case the pattern generator 37 projects a series of images onto the lowermost surface 27 of the photohardenable material 25. The images pass through the transparent, rigid or semi-rigid panel 36 (if present) and inhibitor permeable film 33 or microfluidic PDMS layer 35 and into the photohardenable material 25. Due to the presence of the inhibitor 47, dead zone 41 is created, and solidification occurs at the build plane 32 instead of at photohardenable material lower surface 27.

Figure 1B:
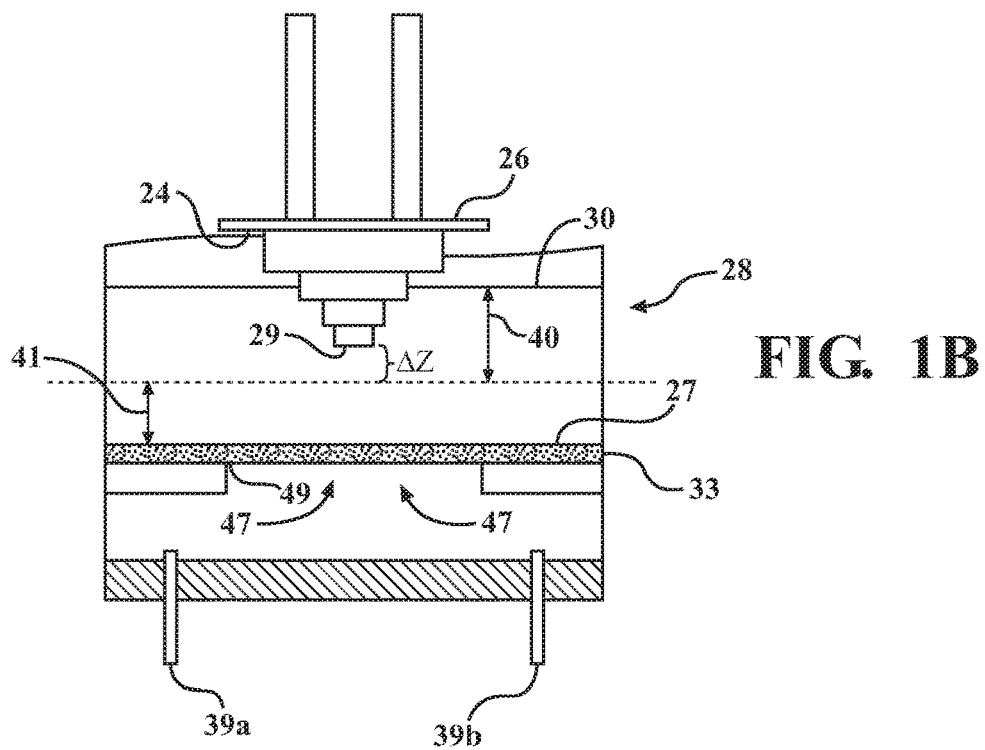
FIG. 1B is a close-up, side-elevational, cross-sectional view of a build platform and photohardenable material container in a first configuration prior to the solidification of a layer of photohardenable material.
Figure 1C:
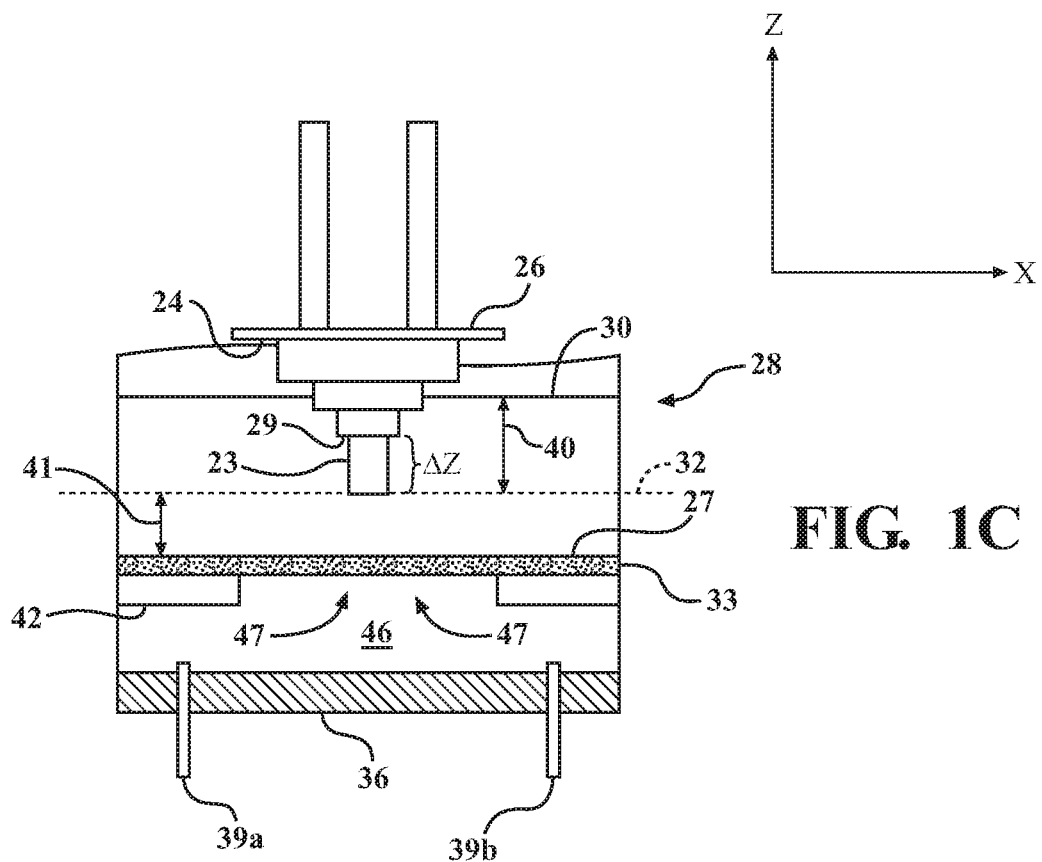
FIG. 1C is a close-up, side-elevational, cross-sectional view of a build platform and photohardenable material container in a second configuration following the solidification of a layer of photohardenable material.

System 20 for making three-dimensional objects from a solidifiable material 25 may be operated in a discontinuous or continuous mode. In the discontinuous mode, immediately prior to the formation of a layer of object 24, the exposed downward facing surface 29 of object 24 is positioned as depicted in FIG. 1B. The exposed downward facing surface 29 is spaced apart from build plane 32 by a layer thickness $\Delta z$. In the discontinuous mode, the build platform 26 and downward facing exposed object surface 29 are stationary at this point. Pattern generator 37 then projects a two-dimensional solidification energy pattern upward along the build (z) axis through the transparent rigid or semi-rigid panel 36 and through inhibitor permeable film 33 and lower surface 27 of photohardenable material 25. The exposure time per image is defined as the variable $t_e$ and is selected to solidify the photohardenable material 25 to the selected layer thickness Δz given the intensity of the projected solidification energy.

The energy pattern passes through dead zone 41 without solidifying the photohardenable material 25 in the dead zone 41 due to the inhibitor 47. Once the energy pattern passes into the build plane 32, it solidifies the photohardenable material 25 to a layer thickness Δz (shown in exaggerated form in FIG. 1C). The build platform 26 is then elevated along the build (z) axis by a distance W wherein W>Δz. The build platform 26 is elevated to this distance to facilitate the flowing of photohardenable material into the space between the exposed downward facing surface 29 of object 24 (FIG. 1B) and film 33 (or PDMS layer 35). After being held at the elevated position for a period of time, build platform 26 is moved downward by the distance W−Δz, and the next layer is solidified. Thus, when operating in a discontinuous mode, the build platform 26 is stationary when solidification energy images are projected into the photohardenable material 25. Conversely, when the build platform 26 is moving in the discontinuous mode, solidification energy is not projected at a level sufficient to cause the photohardenable material 25 to solidify.

System 20 may also be operated in a continuous mode. In the continuous mode, the build platform 26 moves along the build (z) axis while the pattern generator 37 projects solidification energy images into the photohardenable material 25. Also, the pattern generator 37 continuously projects solidification energy images (except for any image switching delays occurring due to limitations of the pattern generator 37). The projected images will have an exposure time $t_e$ associated with them. The exposure time $t_e$ is the time during which any one image is projected. However, the identical image may be projected repeatedly for portions of a given object, in which case that image may be projected by a multiple of the exposure time $t_e$. The layer thickness Δz defined for the discontinuous mode of operation defines an incremental distance along the build (z) axis between images projected in succession by pattern generator 37 during the continuous mode. The incremental distance between consecutive image exposures Δz may be related to the speed of movement of the build platform 26 along the build (z) axis and the exposure time $t_e$ as follows.

$$\Delta z = (dz/dt) \times (t_e) \quad (1)$$

wherein, Δz=change in build platform position between consecutive image exposures (microns, μt);
dz/dt=build platform speed along the build axis (μ/sec);
$t_e$=exposure time per image (sec).

When the layer thickness Δz is fixed, the build platform speed dz/dt required for a given exposure time may be calculated by rearranging equation (1) as follows:

$$dz/dt = (1/t_e)(\Delta z) \quad (2)$$

A bitmap or other data representation (such as a set of voxel data) of each layer will define the image that is projected by the pattern generator 37. Thus, each bitmap will correspond to a layer index k that defines a build (z) axis position. The bitmaps or other data files used to drive the exposure by pattern generator 37 are switched every $t_e$ seconds. If a region of the object is being formed where the cross-sectional area does not change, the bitmaps need not be switched. Instead, the same bitmap may be used for a selected number of periods $k_x$, over a total aggregate exposure time of $k_x t_e$ where $k_x$, is also equal to the number of consecutive, identical layers, and $t_e$ is the exposure time.

One advantage of providing a dead zone 41 is that the most recently solidified object section 23 (FIG. 1C) does not have to be separated from the bottom 36 of the photohardenable material container 28 or the film 33 (or whatever surface the photohardenable material 25 is in contact with). Because of this, system 20 can be operated in the continuous mode throughout the duration of an object build process. However, it has been found that when the object 24 has a maximum cross-sectional area (perpendicular to the build (z) axis) which exceeds a certain threshold, if the build platform speed dz/dt is too high, the amount of inhibitor 47 in the dead zone 41 may be increase, causing the dead zone 41 to increase in height along the build (z) axis. If this happens, channels may form in object 24 and/or delamination may occur. As a result, the build platform speed along the build axis dz/dt must be reduced to a value that will allow the layers with the largest cross-sectional area to form properly and prevent the expansion of dead zone 41, which can slow down the entire build process.

It has been found that by operating system 20 in an alternating sequence of continuous and discontinuous modes, the overall time required to make a three-dimensional object 24 may be reduced relative to a scenario in which the continuous mode is used throughout the formation of the object. At a given build platform speed dz/dt, periodic switching to a discontinuous mode has been found to prevent the depletion of the photohardening inhibitor in the dead zone 41 in the regions of the objects having cross-sectional areas that exceed certain thresholds.

In certain examples, if the largest continuous cross-sectional area of the three-dimensional object is less than about 0.5 cm², preferably less than about 1.0 cm², and more preferably less than about 1.5 cm², the continuous mode of operation is used throughout the entire process of making the three-dimensional object.

In other examples, the continuous and discontinuous modes of operation are alternated at a frequency that depends on the area of the largest cross-sectional area in the object. In the same or other examples, the frequency at which the modes are switched increases as the largest cross-sectional area in the object increases.

In one scenario, if the largest continuous cross-sectional-area of the three-dimensional object is at least about 1.5 cm², the continuous and discontinuous modes are alternated at least every ten layers, preferably, at least every eight layers, and more preferably, at least every five layers. In the same or other examples, if the largest continuous cross-sectional area of the three-dimensional object is at least about 2.0 cm², preferably at least about 2.2 cm², and more preferably at least about 2.5 cm², the continuous and discontinuous modes are alternated at least every five layers, preferably every four layers, and more preferably every three layers.

Figure 5:
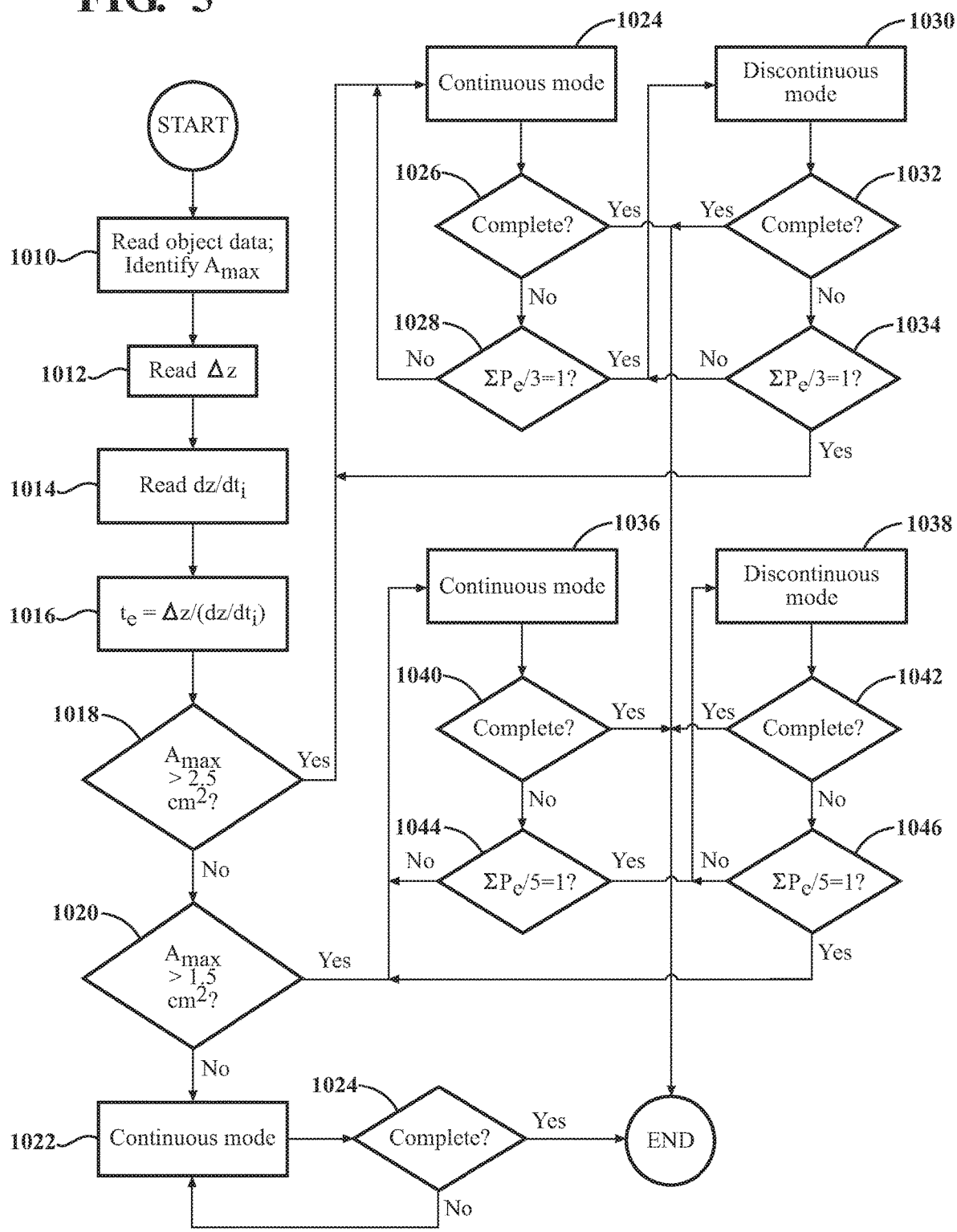
FIG. 5 is a flow diagram depicting a method of operating the system of FIG. 1A in which an object build process includes both continuous and discontinuous modes of operation.

Referring to FIG. 5, a flow chart illustrating a method of forming a three-dimensional object using alternating continuous and discontinuous modes of operation is provided. In step 1010, object data (such as that provided in .stl files, bitmap files, or voxel data files) is read, and the largest cross-sectional area (perpendicular to the build (z) axis) in the object is identified. A desired layer thickness Δz is then read from the appropriate data file in step 1012. Thinner layer thicknesses provide for better resolution and smoother, more accurate parts. However, as the layer thickness shrinks, the overall time required to complete an object build increases. In certain examples according to the present disclosure, the layer thickness Δz is at least about 20 microns, preferably at least about 30 microns, more preferably at least about 40 microns, and still more preferably at least about 45 microns. In the same or other examples, the layer thickness Δz is no greater than about 80 microns, preferably no greater than about 70 microns, more preferably not greater than about 60 microns, and still more preferably no greater than about 55 microns.

In step 1014 an initial build platform speed dz/dt along the build (z) axis is read. The build platform speed is initially chosen to keep the photohardening inhibitor permeable film 33 in a substantially flat condition. Based on the selected layer thickness Δz and build platform speed (dz/dt), an exposure time $t_e$ may be calculated, which is the time the pattern generator 37 projects an image for a given layer index value (k=1 to $K_{max}$) onto the surface of the photohardenable material facing the pattern generator 37 (e.g., the surface of photohardenable material 25 in contact with film 33 or microfluidic PDMS 35).

In preferred examples, the system 20 is switched between continuous and discontinuous modes of operation at a switching frequency that is dependent on the largest cross-sectional area of the three-dimensional object being built. Multiple area thresholds may be used to define multiple switching frequencies. In the method of FIG. 5, two area thresholds are used: 2.5 cm² and 1.5 cm². Each area threshold defines a different frequency of switching between continuous and discontinuous operation. The larger area triggers a higher switching frequency (i.e., fewer layers before the mode is switched). In step 1018 the maximum cross-sectional area $A_{max}$ of the object is compared to the higher area threshold of 2.5 cm². If the object has a cross-sectional area that is greater than 2.5 cm² anywhere along its build (z) axis height, control transfers to step 1024 where the continuous mode is first used. In step 1024 the build platform 26 moves continuously upward along the build (z) axis as images are exposed. Although not shown, a timer may be provided (in software) to determine the elapsed time of operation once the build platform 26 begins moving along the build (z) axis. In step 1024 every time an exposure period $t_e$ elapses on the timer, a period counter is incremented ($\Sigma P_e$), and a check is performed in step 1026 to determine if the last layer of the object has been solidified (i.e., k=$K_{max}$). If the last layer has been solidified (i.e., step 1026 returns a value of "YES"), the method ends. During step 1024, the projection of images from the pattern generator 37 is uninterrupted (except for delays caused by hardware or software limitations in the pattern generator 37 when the projected image changes), and the build platform 26 moves continuously upward along the build (z) axis. Instead of starting with the continuous mode, as shown in FIG. 5, an object build could start with the discontinuous mode. Also, in some implementations, a series of "burn-in" layers are created at the beginning of the object build process to better adhere object 24 to build platform 26. In making the burn-in layers, the exposure time may be increased (or the intensity may be increased if possible) to overcure the layers to a layer depth greater than Δz.

In preferred examples, during the continuous mode of operation the photohardening inhibitor 47 continues to permeate the film 33 and maintain the dead zone 41, preferably at a substantially constant build (z) axis height, to ensure that the photohardenable material 25 solidifies sufficiently to connect the each layer to the previous layer of the object. In certain preferred examples, the displacement of film 33 is monitored using a displacement detector, and the photohardening inhibitor pressure and/or build platform speed dz/dt are manipulated to keep the film 33 substantially flat. In the case of a microfluidic PDMS layer 35 (FIG. 4) laminated to a rigid or substantially rigid panel 36, the displacement of microfluidic PDMS layer 35 is not an issue.

The switching frequency when the cross-sectional area is greater than 2.5 cm² is three (3) layers. Therefore, step 1028 determines whether the continuous method has been carried out for three layers by dividing the sum of the elapsed exposure periods $\Sigma P_e/3$ by 3 to determine if the result is 1 (assuming $P_e$ was initialized to zero when step 1024 began). Each time the exposure time $t_e$ elapses, the number of exposure periods $\Sigma P_e$ is incremented by one. So, if an exposure time $t_e$ of two (2) seconds is used, every time an additional two seconds expires, the number of exposure periods $\Sigma P_e$ is incremented by one. Thus, in step 1028, once three exposure periods have elapsed, the value of $\Sigma P_e/3$ will have a value of 1, causing step 1028 to return a value of "YES."

When step 1028 returns a value of YES, control transfers to step 1030 to begin the discontinuous mode of operation. As mentioned previously, during the discontinuous mode of operation, pattern generator 37 projects solidification energy images on the downward facing surface 27 of photohardenable material 25 only when the build platform 26 is stationary. After each layer is solidified, the build platform 26 is elevated by a distance W which is greater than the layer thickness Δz to allow unsolidified photohardenable material 25 to fill the gap between the downward facing surface 29 of object 24 and the film 33 (FIG. 1B).

Step 1032 is carried out after each layer is solidified to determine if the object is complete (i.e., k=$K_{max}$). If the object is complete, the method ends. Otherwise, step 1034 is carried out to determine if the switching frequency of three (3) has been reached (i.e., $\Sigma P_e/3$ is 1, assuming $\Sigma P_e$ was initialized to zero at the beginning of step 1030). If the switching frequency of 3 has been reached, control transfers to step 1024 and the process continues.

If the area threshold of 2.5 cm² is not exceeded, step 1018 returns a value of NO and control transfers to step 1020. In step 1020 the largest cross-sectional area $A_{max}$ of the object 24 is compared to a threshold value of 1.5 cm². If step 1020 returns a value of YES, control transfers to step 1036 and the continuous mode of operation is commenced. Steps 1036, 1040, and 1044 operate the same way that steps 1024, 1026, and 1028 do, respectively, except that the switching frequency in step 1044 is five (5) layers. Thus, in step 1036 the continuous mode of operation is commenced and each time an exposure period $P_e$ elapses, it is determined whether the object build is complete. Step 1040. If the object build is complete, step 1040 returns a value of YES, and the method ends. Otherwise, control transfers to step 1044 and the number of elapsed periods $P_e$ in the current continuous mode of operation is divided by the switching frequency of five (5) layers. If $\Sigma P_e/5$ is not one (step 1044 returns a value of NO), control transfers to step 1036 and the current continuous mode continues. If $\Sigma P_e/5$ is one (assuming $\Sigma P_e$ is initialized to zero when step 1036 begins), step 1044 returns a value of YES and control transfers to step 1038 to begin the discontinuous mode of operation, which is carried out as described for step 1030. After each layer is formed, step 1042 determines whether the object is complete (i.e., k=$K_{max}$). If step 1042 returns a value of YES, the method ends. Otherwise, control transfers to step 1046 to determine if the mode switching frequency (five) has been reached. If it has, control transfers to step 1036 to switch to the continuous mode of operation. If step 1046 returns a value of NO, control transfers to step 1038 to continue the current discontinuous mode of operation.

If step 1020 returns a value of NO, then the largest cross-sectional area $A_{max}$ is below a threshold where mode switching occurs and a continuous mode may be used for the entire object. In that case, control transfers to step 1022 to enter a continuous mode of operation. After each exposure period $P_e$, step 1025 determines whether the object is complete. If step 1025 returns a value of YES, the method ends. Otherwise, the continuous mode of operation continues.

Example 1

The use of mode switching such as in the exemplary method of FIG. 5 allows objects whose maximum cross-sectional area exceeds certain thresholds to be built more quickly than would be the case if a continuous mode were used throughout the object build. This is the case because the build platform speed dz/dt is constant throughout the object build and must be set low enough to form the largest continuous cross-sectional area $A_{max}$ without depleting the dead zone 41.

An object is built in 50 micron layers (i.e., $\Delta z=50\mu$) using (i) an entirely continuous mode of operation and (ii) mode switching. The object is built using both techniques on the same system 20 and has a largest continuous cross-sectional area of 2.5 cm². In order to avoid expanding the dead zone 41, the exposure time $t_e$ is set at 15 seconds, yielding a build platform speed along the build axis (dz/dt) of $50/15=3.33\mu$/sec. In other words, during the continuous mode of operation, it takes 15 seconds for the build platform 26 to move 50 microns. The speed is maintained in forming the entire object.

Using mode switching with a mode switching frequency of five (5) layers (at 50μ each) and a post solidification travel distance W of 3 mm, the exposure time $t_e$ may be set at 3-5 seconds. In the discontinuous mode, each layer takes approximately 10-12 seconds to form, including moving the build platform the distance W and bringing it down to W−Δz, solidifying the layer, and separating the object from the layer. The same oxygen (inhibitor) pressure is used in both runs (i) and (ii). Using mode switching, the object is completed in 57 minutes. Using continuous motion during the entire build, the object is completed in 2 hours and 4 minutes. As a result, mode switching allows the object to be built significantly faster than would be the case if only continuous or only discontinuous operation were used.

Figure 6:
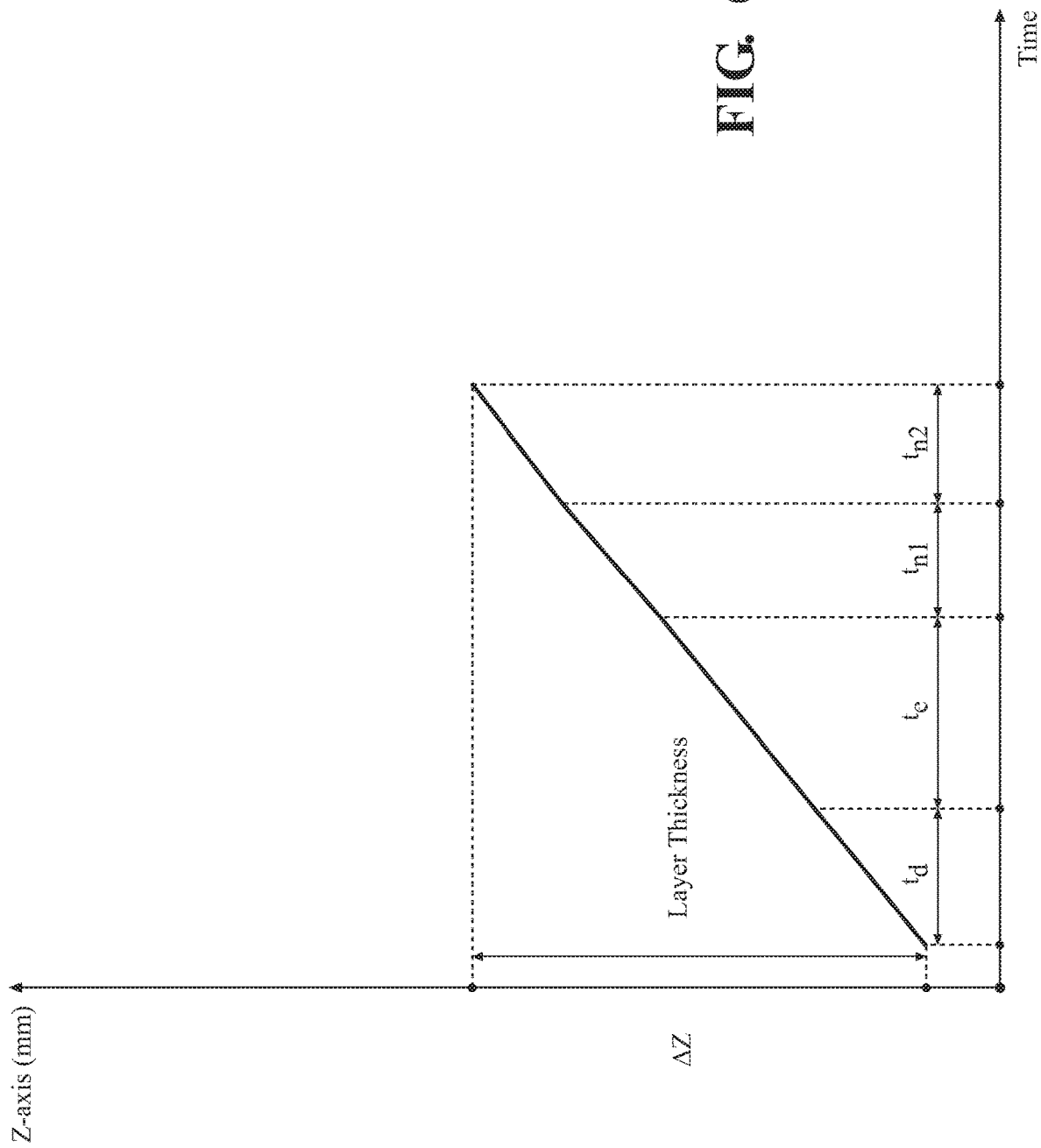
FIG. 6 is a graph depicting a method of operating the system of FIG. 1A in which different exposure times are used for different independent continuous regions of a layer of a three-dimensional object.
Figure 7:
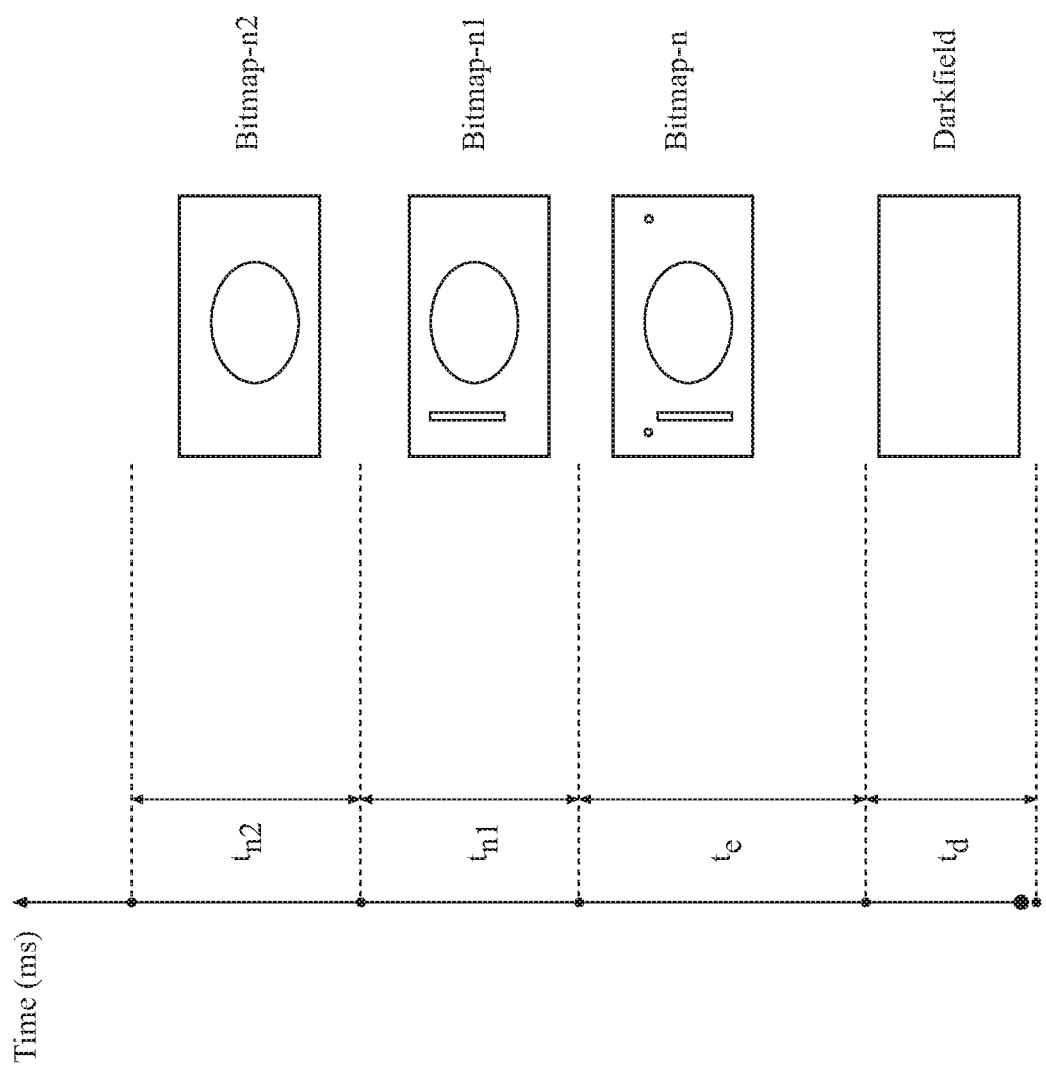
FIG. 7 is a graph depicting a series of bitmaps corresponding to the exposure times of FIG. 6.
Figure 10:
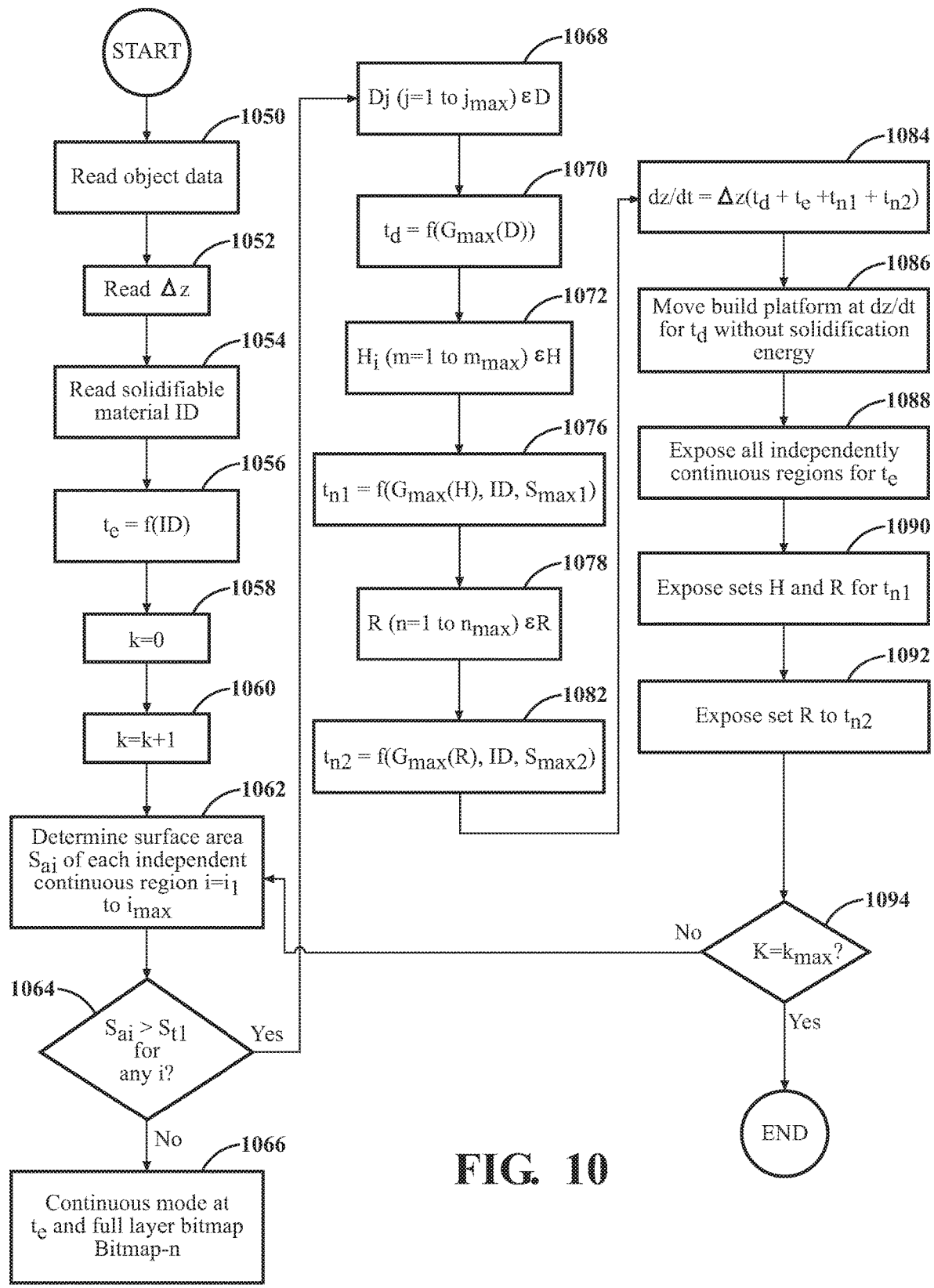
FIG. 10 is a flowchart depicting a method of making a three-dimensional object using the exposure time profile of FIG. 6 and the bitmaps of FIG. 7.

Referring now to FIGS. 6, 7, and 10, another method for preventing the excessive expansion of the dead zone 41 will now be described.

In accordance with the method, independent continuous regions of the object within a layer which have different surface area and slenderness values are exposed to solidification energy for different exposure times. An "independent continuous region" is a region of an object layer in the x-y plane that is uninterrupted and not connected to another region of the object in that layer. A bitmap may be used to graphically represent image data by depicting the intensity of pixels at different x-y locations for a layer. In accordance with the method, geometric parameters are identified which indicate that the object size and shape may cause fluid disturbances that result in a pressure drop around the periphery of the object unless the build platform 26 speed is reduced and exposure time is increased. In general, the parameters are used to select those independent continuous regions that require slower build platform speeds and longer exposure times, which in turn dictates which independent continuous regions are examined to determine an exposure time. A variety of different parameters may be used. Three parameters discussed below are surface area, slenderness or inverse slenderness, and the ratio of the inner void area to the outer contour area.

The "surface area" is the area in the x-y plane of the independent continuous region as defined by the outer contours of the area (i.e. inner void areas are not subtracted). As used herein, "surface area" is synonymous with "outer contour surface area." As is known in the art, the greater an area pushing against a fluid is, the higher the pressure. As the surface area increases (if there are no voids or at constant void area), the pressure at the perimeter of the three-dimensional object decreases, causing a pressure drop between the photohardening inhibitor supply and the object, which leads to an increased inhibitor flow rate. The "slenderness" (represented as "G" herein) is the ratio of the surface area of an independent continuous region to the length of the perimeter of the region. The slenderness reflects the fact that for a given object area, objects that are substantially larger in one dimension relative to another may create fewer fluid disturbances when moved in a volume of solidifiable material. "Inverse slenderness" may also be used, and as referred to herein, is defined as the square of the length of the contour of an independent continuous region divided by the surface area of the region. The term "slenderness criterion" encompasses both slenderness and inverse slenderness. In certain examples herein, the surface area, slenderness (or inverse slenderness) and ratio of inner void area to outer contour area are used to determine whether to include an independent continuous region in a set of regions used to determine an exposure time. The parameters are compared to various criteria to make this determination.

Although large surface areas may impact the required exposure time and build platform speed, the situation may be different for an independent continuous region with a significant amount of void space in it because the solidifiable material can flow through the holes. Thus, the ratio of the sum of the inner void areas in an independent continuous region to the outer contour surface area of the region (sometimes called the "void ratio" or "ratio," herein) is also described herein as a geometric parameter used to determine whether a particular independent continuous region should be considered in determining an exposure time or build platform speed. A low ratio indicates that the region should be included. In FIG. 7, Bitmap-n has four independent continuous regions. All four of the independent continuous regions are solidified for an exposure time $t_e$. Two of them are solidified for a cumulative exposure time of $t_e+t_{n1}$, and one of them is solidified for a cumulative exposure time of $t_e+t_{n1}+t_{n2}$. In addition, the build platform 26 moves for a dead time $t_d$ while solidification energy sufficient to solidify the solidifiable material is not projected. Thus, as shown in FIG. 6, for a single layer of the object having a thickness of Δz, the build platform moves a distance Δz along the build axis during a cumulative time $t_d+t_e+t_{n1}+t_{n2}$. Thus, the speed of movement of the build platform 26 along the build (z) axis is $dz/dt=\Delta z/(t_d+t_e+t_{n1}+t_{n2})$. As described previously, when using certain solidifiable material containers, such as container 28 in FIG. 1B, the inhibitor pressure in chamber 46 may be adjusted to keep film 33 substantially planar. In addition, if the pressure reaches a high or low limit, the build platform 26 speed of movement along the build (z) axis may be adjusted to keep film 33 substantially planar. In such cases, if the build platform 26 speed is adjusted, the dead time $t_d$ is preferably also adjusted to keep the layer thickness Δz constant.

In preferred examples, the dead time $t_d$ is determined by the slenderness (or inverse slenderness) of a certain sub-set of independent continuous regions D. In the same or other examples, $t_e$ is determined based on the composition of the solidifiable material used and may be indicated by a material identifier in a database associated with system 20. In the same or other examples, the sub-set D is a set of independent continuous regions that satisfy a surface area criterion ($>S_{t2}$), a slenderness ($>G_t$) or inverse slenderness ($<G'_t$) criterion, and inner void area to outer contour area ($<r_t$). The set of independent continuous regions D used to determine the dead time $t_d$ may be defined as follows:

$$D_j(j=1 \text{ to } j_{max}) \in \{S_{ai} > S_{t2}, ((G_{ai} > G_t) \text{ or } (G'_{ai} < G'_t)) \text{ and ratio} < r_t\} \quad (3)$$

wherein, $D_j$ is a member of the set D of independent continuous regions of a layer used to determine a dead time $t_d$ for the layer;

j is an index ranging from 1 to $j_{max}$ identifying those independent continuous regions $D_j$ that belong to the set D;

$G_{ai}$ is the slenderness of the independent continuous region i of the current layer (mm);

$G_t$ is a threshold slenderness used to determine the set D (mm);

$G'_{ai}$ is an inverse slenderness of independent continuous region i (dimensionless);

$G'_t$ is an inverse slenderness threshold used to determine set D;

$r_t$ is the void ratio threshold used to determine $D_j$;

i is an index identifying the independent continuous region from amongst all independent continuous regions in the layer.

The dead time is determined based on the maximum slenderness or minimum inverse slenderness of the set D, i.e.:

$$t_d = f(G_{max}(D) \text{ or } G'_{min}(D)) \quad (4)$$

Suitable dead times $t_d$ are determined experimentally and stored in a process computer database that relates them to $G_{max}$ or $G'_{min}$.

An alternate method of determining the dead time td for a layer of a three-dimensional object will now be described with reference to FIG. 13. In accordance with the method, a dead time for each independent continuous region $t_{di}$ is determined for each layer, and the maximum value of the dead times $t_{di}$ for the independent continuous regions is selected as the layer dead time $t_d$. Referring to FIG. 13, surface area thresholds $A_1$ and $A_2$ are experimentally determined and are used to define three surface area regimes for a given independent continuous region i. In the first regime, the independent continuous region surface area Ai is greater than zero and not greater than the first surface area threshold $A_1$. In the second regime, $A_i$ is greater than the first surface area threshold $A_1$ and no greater than a second surface area threshold $A_2$. In the third regime, Ai is greater than $A_2$.

If the independent continuous region surface area $A_i$ is greater than zero and not greater than $A_1$, the dead time for that region $t_{di}$ is zero regardless of the values of the slenderness, inverse slenderness or inner void area to outer contour area ratio ("Void Ratio").

If the independent continuous region surface area $A_i$ is greater than the first surface area threshold A1 and not greater than the second surface are threshold $A_2$ and the inverse slenderness value $G'_i$ for the region is greater than zero and less than the first inverse slenderness threshold $G'_1$, the dead time for the region $t_{di}$ is zero. If the inverse slenderness for the region is greater than the first inverse slenderness threshold $G'_1$, then the region dead time $t_{di}$ depends on the value of the region's void ratio (i.e., the inner void area to the outer contour area ratio). If the void ratio for the region $R_i$ is greater than zero and not greater than a first void ratio threshold $R_1$, the region dead time has a first non-zero value $t_{di}(1)$. If the void ratio for the region $R_i$ is greater than the first void ratio threshold, the dead time for the region $t_{di}$ is zero.

If the independent continuous region surface area is greater than the second surface area threshold $A_2$, and the inverse slenderness for the region $G'_1$ is greater than zero and not greater than a second inverse slenderness threshold $G'_2$, regardless of the value of the void ratio, the dead time for the region will have a non-zero value $t_{di}(2)$. If the inverse slenderness for the region $G_i$ is greater than the second inverse slenderness threshold and not greater than a third inverse slenderness threshold $G'_3$, the dead time for the region will have a third non-zero value $t_{di}(3)$, where $t_{di}(3)$ is less than $t_{di}(2)$. If the inverse slenderness for the region is greater than the third inverse slenderness threshold $G'_3$, and the void ratio $R_i$ is greater than zero and not greater than a second void ratio $R_2$, the dead time for the region $t_{di}$ will have a fourth non-zero value $t_{di}(4)$, where $t_{di}(4)$ is less than $t_{di}(2)$ and $t_{di}(3)$. However, if the void ratio for the region $R_i$ is greater than the second void ratio threshold $R_2$, the dead time is zero. Thus, the table of FIG. 13 defines the dead time of an independent continuous region of an object layer as a continuous function of the region's surface area $A_i$, inverse slenderness $G'_i$, and void ratio $R_i$.

To determine the exposure time $t_{n1}$, a first-subset H of independent continuous regions is identified. The set H is defined by those independent continuous regions that satisfy a surface area criterion ($S_{t3} < S_{ai} \le S_{t4}$), a slenderness ($>G_{t2}$) or inverse slenderness ($<G'_{t2}$)) criterion, and an inner void area to outer contour area ratio criterion ($<r_{t2}$). The set of all independent continuous regions H used to determine exposure time $t_{n1}$ are defined as follows:

$$H_i(m=1 \text{ to } m_{max}) \in \{S_{t3} < S_{ai} \le S_{t4}, ((G_{ai} > G_{t2}) \text{ for } (G'_{ai} < G'_{t2}) \text{ and ratio} < r_{t2}\} \quad (5)$$

wherein, $H_i$ is a member of the set H of independent continuous regions of a layer used to determine an exposure time $t_{n1}$;

$S_{ai}$ is the surface area of independent continuous region i in a current object layer (mm$^2$);

$G_{ai}$ is the slenderness of independent continuous region i (mm);

$G_{t2}$ is the threshold slenderness used to determine set H (mm);

$G'_{ai}$ is the inverse slenderness of independent continuous region i (dimensionless);

$G'_{t2}$ is the threshold inverse slenderness that may be used to determine set H (dimensionless); and m is an index ranging from 1 to $m_{max}$ identifying those independent continuous regions $H_i$ which belong to set H.

The maximum surface area in the set H may be defined as $S_{max}(H)$. The maximum slenderness value in the set H may be defined as $G_{max}(H)$. The minimum inverse slenderness may be defined as $G'_{min}(H)$. The value of the exposure time $t_{n1}$ for the first subset of object data in the layer is a function of the maximum area and maximum slenderness in the set H and the solidifiable material (identified by an identifier ID in a database). Thus, $t_{n1}$ may be defined as follows:

$$t_{n1} = f(G_{Max}(H) \text{ or } G'_{Min}(H), ID, S_{max}(H)) \quad (6)$$

where, $t_{n1}$ is an exposure time (sec) for subset 1 of the independent continuous regions of the current layer;

ID is a text identifier identifying the solidifiable material;

$S_{max}(H)$ (mm$^2$) is the maximum surface area in the set H;

$G_{Max}(H)$ is the maximum slenderness value in the set H (mm).

$G'_{Min}(H)$ is the minimum inverse slenderness value in the set H (dimensionless).

Similarly, a second sub-set R of independent continuous regions having a surface area $S_{ai}$ which exceeds the fourth threshold is identified:

$$R_i(n=1 \text{ to } n_{max}) \in \{S_{t4} < S_{ai}, ((G_{ai} > G_{t3}) \text{ or } (G'_{ai} < G'_{t3})) \text{ and ratio} < r_{t3}\} \quad (7)$$

Wherein, R is a member of the set R, which is the set of independent continuous regions used to determine the second sub-set exposure time $t_{n2}$. The value of the exposure time $t_{n2}$ of the second subset of object data in the layer is a function of the maximum area and maximum slenderness $G_{max}(R)$ or minimum inverse slenderness $G'_{min}(R)$ in the set R. Thus, $t_{n2}$ may be defined as follows:

$$t_{n2} = f(G_{max}(R) \text{ or } G'_{min}(R), ID, S_{max}(R)) \quad (8)$$

where, $t_{n1}$ is an exposure time (sec) for subset 2 of the independent continuous regions of the current layer;

ID is a text identifier identifying the solidifiable material;

$S_{max}(R)$ (mm$^2$) is the maximum surface area in the set R;

$G_{max}(R)$ is the maximum slenderness value in the set R.

$G'_{min}(R)$ is the minimum slenderness value in the set R.

As shown in FIG. 7, a single layer is exposed using multiple bitmaps. Bitmap-n includes all of the independent continuous regions of a layer, and solidification energy is projected into the building region 32 of the solidifiable material 25 for the full layer exposure time $t_e$ using Bitmap-n. Bitmap-n1 is a first subset of Bitmap-n, and solidification energy is projected into building region 32 in accordance with Bitmap-n1 for an exposure time of $t_{n1}$. Bitmap-n2 is a second subset of Bitmap-n and is also a subset of Bitmap-n1, and solidification energy is projected into building region 32 in accordance with Bitmap-n2 for an exposure time of $t_{n2}$.

Referring to FIG. 10, a method of making a three-dimensional object by solidifying a solidifiable material is depicted. The method involves the use of a dead zone provided by a source of photohardening inhibitor 47 entering a volume of the solidifiable material 25 by permeating a photohardening inhibitor permeable layer 33. The inhibitor 47 enters a surface of the solidifiable material at an interface 27 between the solidifiable material 25 and the photohardening inhibitor permeable layer 33. Exemplary system 20 may be used with any of the solidifiable material containers of FIGS. 2-4, for example.

In step 1050 object data is read by a process computer for the entire object. This may also occur a layer at a time instead of as a single step. The selected layer thickness $\Delta z$ which defines the resolution of the object is read in step 1052. In step 1054 a solidifiable material identifier material ID ("ID") is read.

In certain examples, a database is maintained in computer readable storage operatively connected to a process computer associated with system 20. The database relates solidifiable material identifiers (IDs) to full layer exposure times per unit curing depth $t_e/\Delta z$. Step 1056. The full layer exposure times per unit curing depth $t_e/\Delta z$ are determined experimentally for each ID by projecting solidification energy onto a specified area and related to one another in a database accessed by the process computer. In step 1058 the layer index k is initialized to a value of zero. The layer index uniquely identifies a position along the build (z) axis at which solidification occurs. The layer index is incremented by one in step 1060.

For the current layer (defined by the current value of k), the surface area $S_{ai}$ of each independent continuous region is determined in step 1062. The index i uniquely identifies each independent continuous region in the layer. If none of the independent continuous regions has a surface area that exceeds a first threshold $S_{t1}$ (step 1064), control transfers to step 1066 and the continuous mode is used for the entire layer. In the continuous mode, a bitmap defining the entire layer is used for the exposure time $t_e$ as the build platform 26 moves along the build (z) axis at a speed equal to $\Delta z/t_e$. When the layer is complete (i.e., when the build platform 26 has traversed the distance $\Delta z$), control transfers to step 1060 to begin the next layer. Thus, for layers with relatively small independent continuous regions, a single exposure time $t_e$ can be used with a full layer bitmap (Bitmap-n).

If in step 1064 at least one independent continuous region of the layer has a surface area $S_{ai}$ that exceeds the first threshold value of $S_{t1}$, in steps 1068-1094 the multiple bitmap method exemplified by FIGS. 6 and 7 is used. A set of independent continuous regions D is identified for which the surface area $S_{ai}$ exceeds a second surface area threshold $S_{t2}$ (which may be the same value as $S_{t1}$) (step 1068). The set D is the set of regions which will be used to determine the dead time $t_d$.

The foregoing method is only used for those layers having at least one independent continuous region with a surface area that exceeds a certain first threshold. Otherwise, the layer is solidified in accordance with the layer data for the whole layer for an exposure time $t_e$ as the build platform continuously moves at a rate of $dz/dt = \Delta z/t_e$ (step 1066). It has been found that by reducing the speed of the build platform 26 movement (by increasing the cumulative exposure time), the reduction in pressure at the periphery of the object relative to the location at which the inhibitor 47 enters the solidifiable material 25 decreases, causing the pressure drop and the flow rate of inhibitor into the solidifiable material 25 to decrease relative to what it would otherwise be if the build platform moved at a continuous speed. Decreasing (or preventing the increase of) the flow rate of inhibitor 47 prevents the expansion of the dead zone 41 and reduces the likelihood of channel formation through the object and delamination of the object.

The "whole layer" exposure time $t_e$ is an exposure time during which all regions of the solidifiable material which are to be solidified are solidified. In preferred examples, $t_e$ is selected based on the solidifiable materials that are used. In certain examples, system 20 includes a computer with a database that relates values of $t_e$ to materials identifiers ID.

For those layers with at least one independent continuous region with a surface area exceeding the first threshold, the bitmap is subdivided based on the surface area and slenderness of the various independent continuous regions. A first set of independent continuous regions D is identified, the members $D_i$ of which satisfy the criteria in Equation (3). Each member $D_i$ of the set D has an index i associated with it, and there are j=1 to $j_{max}$ members of the set D. In step 1070 the dead time $t_d$ is determined. The dead time $t_d$ is a function of the maximum slenderness value ($G_{max}$) or minimum inverted slenderness value ($G'_{min}$) for any of the independent continuous regions $D_i$ in the set D. In certain examples, system 20 is operatively connected to a database that relates dead time values $t_d$ to maximum slenderness $G_{max}(D)$ values associated with surface areas $S_{ai}$ at or above a specified threshold $S_{t2}$. The dead time may be determined using a variety of different functions. For example, it could be a continuous or discontinuous function of the maximum surface area and smallest inverted slenderness (or maximum slenderness) of the set D (for a given solidifiable material). Equation (4) (above) is merely exemplary. The table of FIG. 13 could also be used to determine the layer dead time $t_d$ as described earlier.

In step 1072 a first sub-set of independent continuous regions H is identified (equation (5)) which will define Bitmap-n1. One exemplary method for determining which members $H_i$ belong to set H is provided by equation (5).

In step 1076 first sub-set exposure time $t_{n1}$ is determined. The value of $t_{n1}$ may be determined in a variety of different ways using continuous or discontinuous functions of the surface area and slenderness (or inverted slenderness) of independent continuous regions $H_i$ comprising the set H (for a given solidifiable material). Equation (6) is one example. In equation (6), first sub-set exposure time $t_{n1}$ is a function of the solidifiable material, maximum slenderness or minimum inverted slenderness, and the maximum surface area $S_{max}$ of the independent continuous regions comprising the set H. The value of $t_{n1}$ is a function of the maximum slenderness $G_{max}(H)$ or minimum inverted slenderness $G'_{min}(H)$ of the independent continuous regions in set H, the solidifiable material (ID), and the maximum surface area $S_{max}$ of any of the independent continuous regions in the set H (equation (5)).

In step 1078 a second sub-set of independent continuous regions R is identified (equation (7)) which will define Bitmap-n2. Each member R has an index value i associated with it and has a surface area $S_{ai}$ that is above a fourth threshold $S_{t4}$.

In step 1082 the second sub-set exposure time $t_{n2}$ is determined. The value of $t_{n2}$ may be determined in a variety of different ways using continuous or discontinuous functions of the surface area and slenderness (or inverted slenderness) of independent continuous regions $R_i$ comprising the set R (for a given solidifiable material). Equation (8) is one example. In equation (8), the second sub-set exposure time $t_{n2}$ is a function of the solidifiable material, maximum slenderness or minimum inverted slenderness, and the maximum surface area $S_{max}$ of the independent continuous regions $R_i$ comprising the set R. In the example of FIG. 6, the change in build (z) axis position of build platform 26 with respect to time is constant. Thus, the build platform speed dz/dt may be calculated (step 1084) as follows:

$$dz/dt = \Delta z/(t_d + t_e + t_{n1} + t_{n2}) \quad (9)$$

where, dz/dt is the build platform speed along the build axis (mm/sec);
$\Delta z$=layer thickness (microns)
$t_d$=dead time (seconds)
$t_e$=full layer exposure time (seconds)
$t_{n1}$=first sub-set exposure time (seconds)
$t_{n2}$=second subs-set exposure time (seconds)

In step 1086, the build platform moves for the dead time $t_d$ during which the pattern generator 37 does not project solidification energy sufficient to solidify the solidifiable material 25. In step 1088 the pattern generator then projects the full layer bitmap (Bitmap-n in FIG. 7) for the full layer exposure time $t_e$, thereby exposing all independent continuous regions of solidification in the layer. In step 1090 the first sub-set H and the second sub-set R of independent continuous regions are solidified for the first sub-set exposure time $t_{n1}$. In step 1092 set R is exposed for the second sub-set exposure time $t_{n2}$.

If the last layer has been completed, the layer index k will have reached its maximum value $k_{max}$, and the process ends (step 1094). Otherwise, control transfers to step 1060, and the next layer is processed.

In some cases, the driver and motor used to move the build platform 26 will be limited in the minimum build platform speed dz/dt they can achieve, which causes $t_e$ to run up against a lower limit. In such cases, it is beneficial to stop the build platform 26 when solidifying sub-sets H and R for the first sub-set exposure time $t_{n1}$ and solidifying the subset R for the second sub-set exposure time $t_{n2}$. Graphically, this would be depicted as by making the line in FIG. 6 horizontal during the exposure periods $t_{n1}$ and $t_{n2}$. As mentioned previously, if the build platform speed along the build (z) axis is adjusted to control the planarity of film 33, the dead time $t_d$ may be adjusted to keep the layer thickness $\Delta z$ constant.

Example 2

PIC 100c, a filled, thermoplastic material provided by Envisiontec, Inc. of Dearborn, Mich. is provided in a system similar to that of FIG. 1A with the solidifiable material container 28 of FIG. 1B. The intensity of the DLP light source is 480 mW/(dm)$^2$. The inhibitor is oxygen, and the chamber 47 is maintained at a pressure of about 0.015 Bar. The surface area threshold used to determine membership in the set D ($St_2$) is 10 mm$^2$. The surface area threshold used to determine membership in the set ($St_3$) is 56 mm$^2$. No value of $St_4$ is used in this example. Nor is a second sub-set R used. The inverse slenderness threshold $G'_t$ is 1.8, and the void ratio threshold rt is 0.5, and is the same value used for determining membership in the set D and the set H. The entire layer exposure time $t_e$ is 6 seconds. The layer thickness $\Delta z$ is 0.05 mm.

In those independent continuous regions wherein the surface area is between $St2$ and $St_3$, the dead time is $t_d$=3 seconds, and the first sub-set exposure time $tn_1$ is 0.5 seconds. In those independent continuous regions where the surface area is greater than 56 mm$^2$, the dead time is 6 seconds, and the first sub-set exposure time $tn_1$ is 0.8 seconds. $St_1$ is less than or equal to $St_2$, and independent continuous regions are present in which the surface area is greater than $St_1$.

Certain objects will include an "overhang." As used herein, the term "overhang pixels" refers to pixels at a specific x, y location which have a gray scale value that is higher than a pixel at the same x, y location in the immediately previous object layer. In the limiting case, the pixels defining an overhang provide a surface that is spaced apart along the build (z) axis from any other surface of the object and from the build platform 26. In other words, it is a surface with an x, y region that is not connected to a previous object layer or the build platform. In many cases, layers of an object are "overcured," i.e., solidification energy greater than that required to achieve the desired layer thickness $\Delta z$ is supplied. For non-overhang layers, such overcuring tends to improve inter-layer adhesion. However, if the bottom surface of an overhang is overcured, the overhang will effectively be distorted because solidifiable material which should not be solidified will be. In cases where overcuring is used, it is desirable to employ a build (z) axis offset to overhang pixels. The build axis offset is a number of bitmaps by which the gray scale value of a particular x, y location is shifted. For example, the x, y location of an overhang pixel may be shifted by a bitmaps so that when layer n is being formed, the overhang pixels are assigned the gray scale values of the bitmap for layer n–a. Once the overhang ends (i.e., once the gray scale values for x, y as defined by the current layer are less than or equal to those in the previous layer), the offset is no longer applied and the pixels are assigned the gray scale value dictated by the currently operative bitmap. Referring to FIG. 7, when bitmap-n corresponds to a particular build (z) axis position and corresponding layer index k, the build (z) axis offset will delay the solidification of the solidifiable material for a specified number of offset layers. The number of offset layers are selected so that any overcuring does not affect the gray scale values of the lower layers beneath the overhang pixels. Thus, in an example with an overhang with no layers immediately beneath it where 50 micron layer thickness are used and the layers are overcured by 200 microns, the offset will be four (4) layers. In some examples, a database may be provided with system 20 which relates the build (z) axis offset to the power of the solidification energy source (e.g., the power of electromagnetic radiation provided by pattern generator 37), the exposure time, and the solidifiable material.

Figure 8:
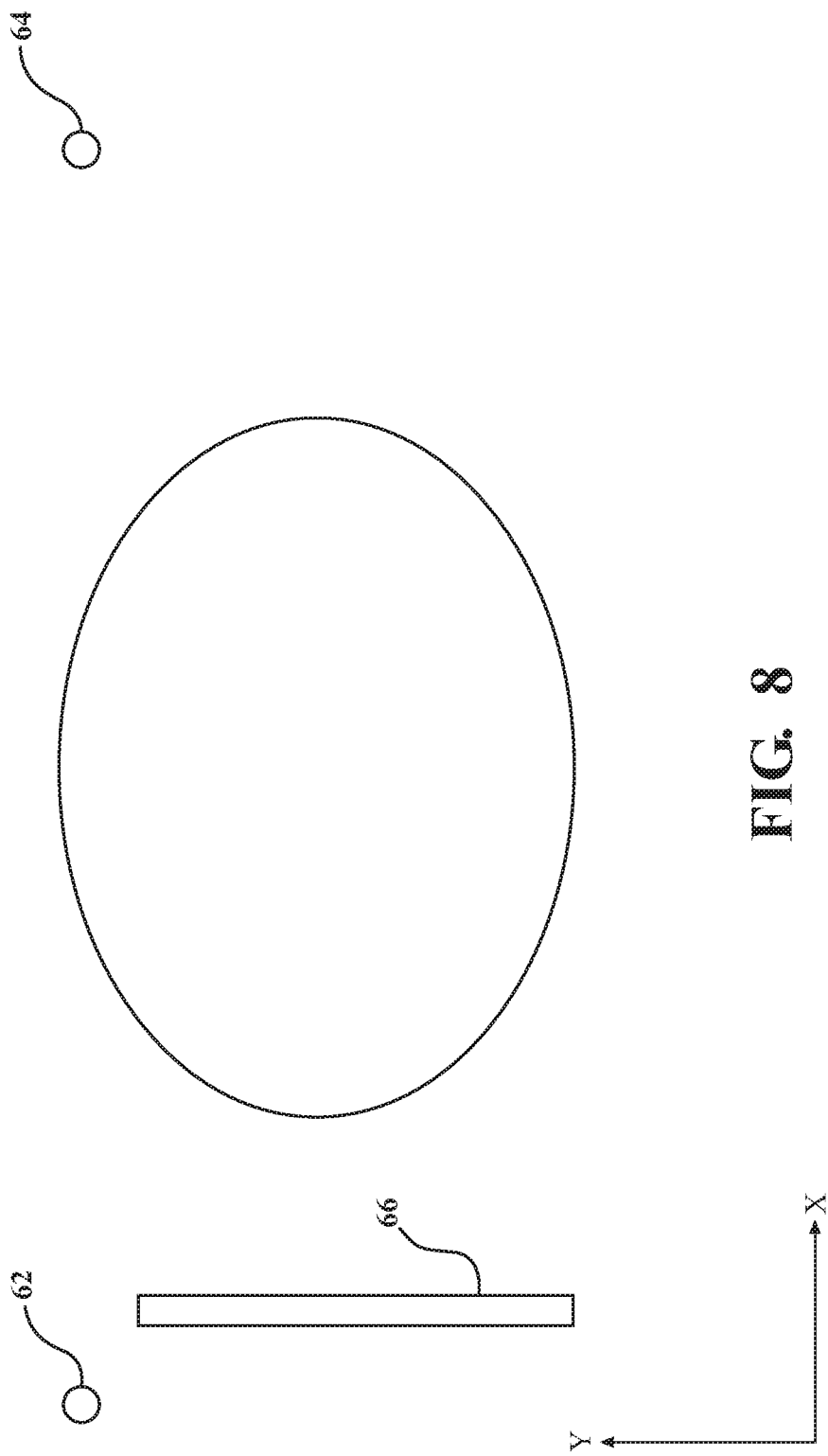
FIG. 8 is a graphical depiction of object data for four independent continuous regions of a layer of a three dimensional object.
Figure 9:
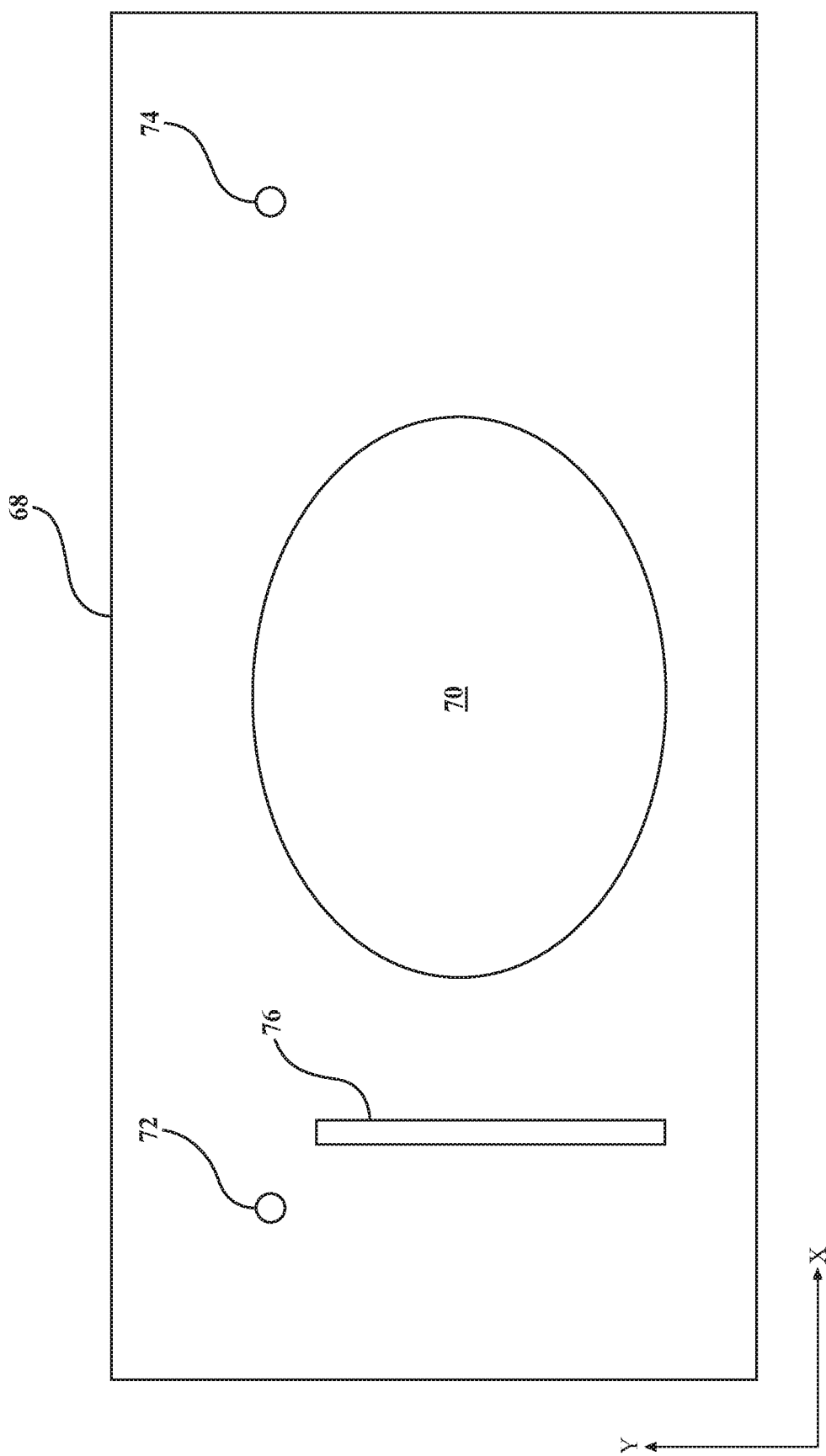
FIG. 9 is a bitmap used to form the four independent continuous regions of a layer of an object shown in FIG. 8.

Another method for preventing the expansion of dead zone 41 using variable radiation intensities (provided such as by gray scaling) will now be described with reference to FIGS. 8-9 and 11. As is known in the art, certain spatial light modulators like digital light projectors and liquid crystal displays have pixels that may transmit intensities of light at values between 0 and maximum intensity. The pixel values are typically referred to as "gray scale" or "color values." FIG. 8 shows independent continuous regions 60, 62, 64, and 66 of a layer of an object, and FIG. 9 is a bitmap 68 that visually depicts gray scale values for corresponding bitmap regions 70, 72, 74, and 76.

In accordance with the method, for each layer the surface areas and slenderness values of each independent continuous region are determined. If the layer does not have at least one independent continuous region with a surface area exceeding a first threshold $S_{t1}$ and a slenderness value exceeding a first threshold $G_{1t}$, variable intensities are not used and the same intensity is projected toward all independent continuous regions of the layer.

Different independent continuous regions of an object layer having different surface areas and slenderness values are solidified at different intensities but for the same full layer exposure time $t_e$. In accordance with the method, each independent continuous region has a surface area $S_{ai}$ that will fall in a particular "bin" or range of surface area values. The surface area range and the maximum slenderness value of the independent continuous regions falling in that range will determine the gray scale value. In one example, a database is provided in which the various bins have a plurality of slenderness values, each of which corresponds to a gray scale value for that bin. If the build platform 26 speed is adjusted along the build (z) axis to control the film 33 planarity (FIG. 1B), exposure times of each pixel will change. To compensate for the changed exposure times, the gray scale values of all active pixels (all pixels with energy sufficient to cause solidification) may be adjusted to maintain a constant layer thickness $\Delta z$.

Figure 11:
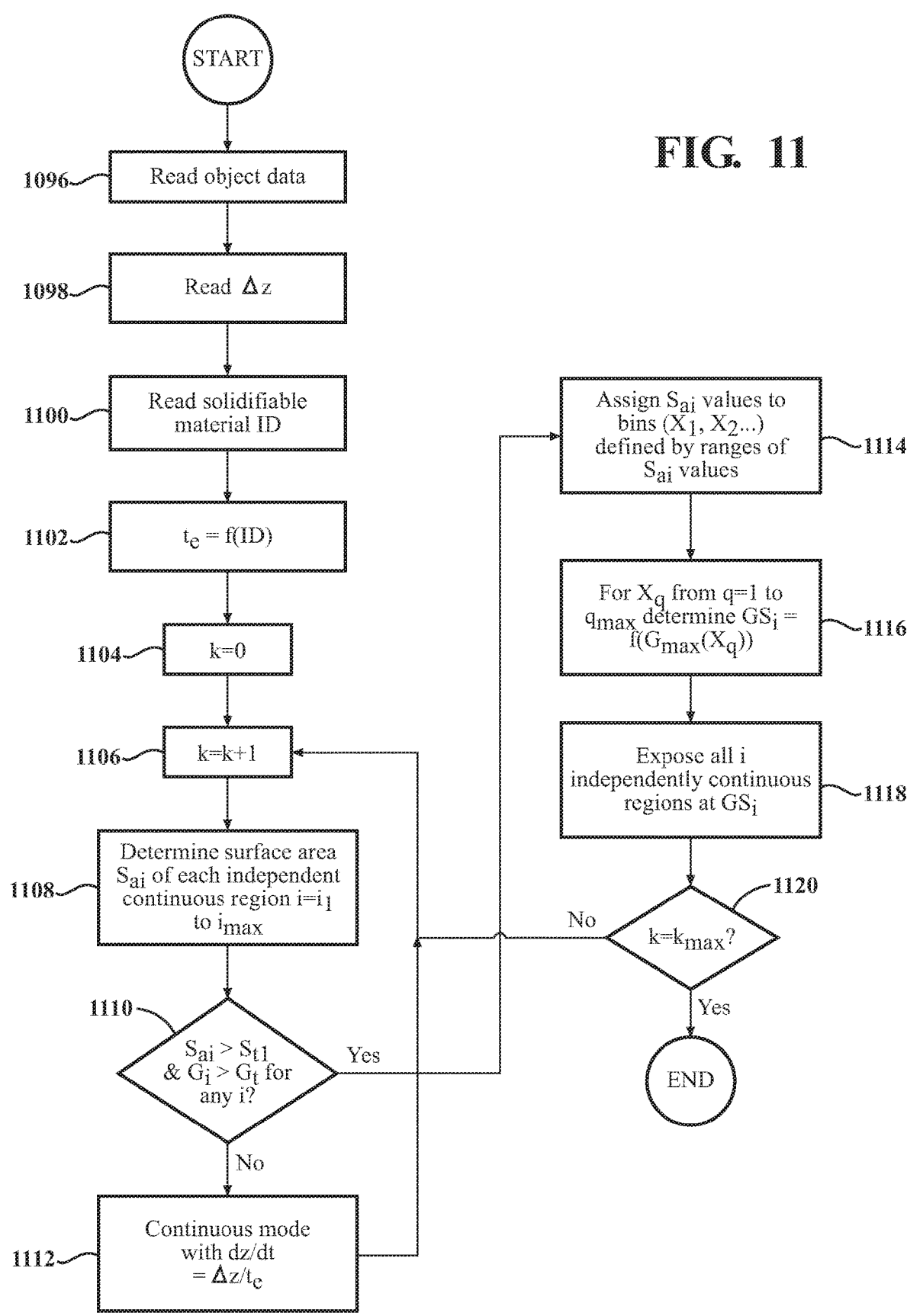
FIG. 11 is a flowchart depicting a method of making a three-dimensional object using the bitmap of FIG. 9.
Figure 12:
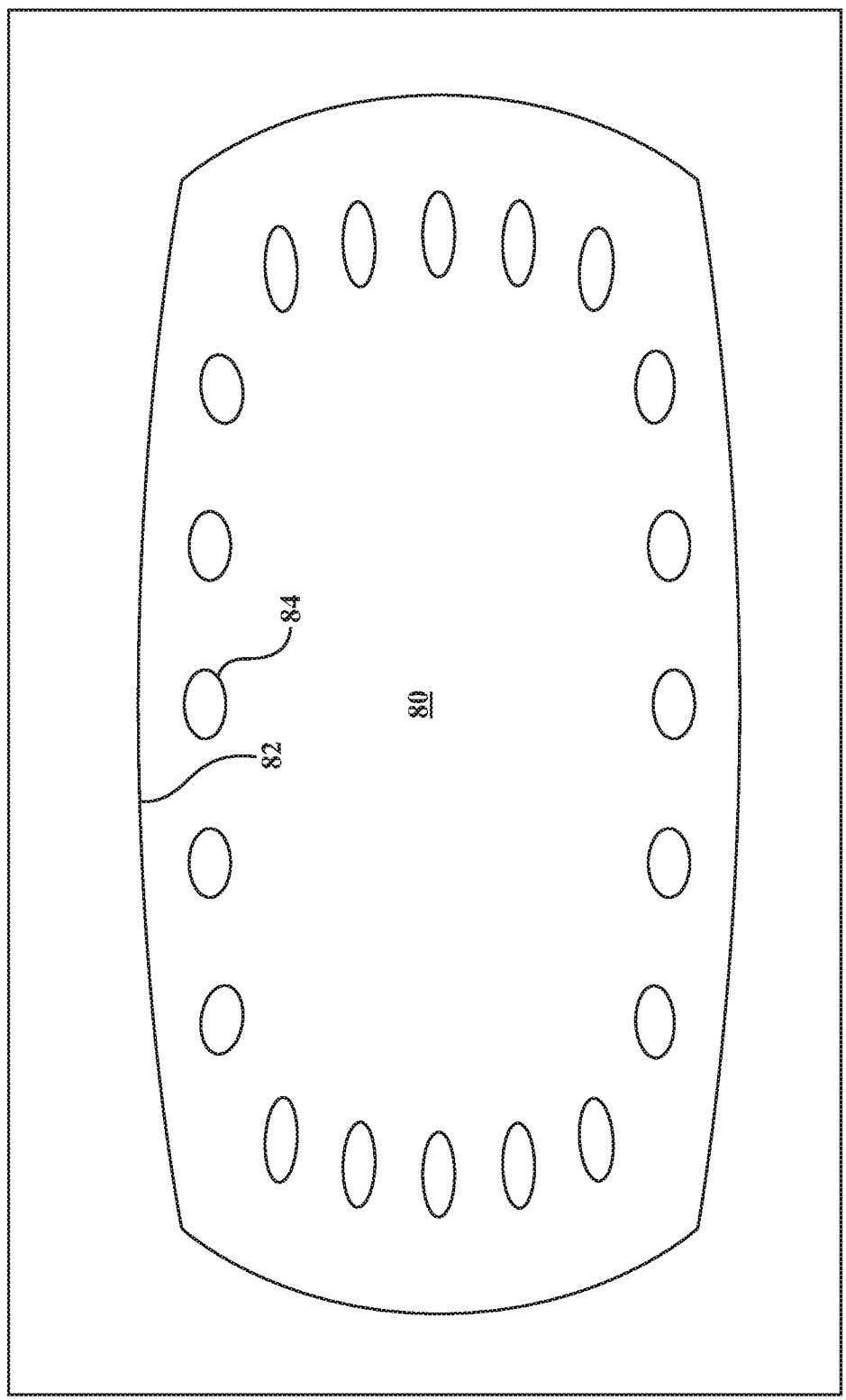
FIG. 12 is a bitmap of an independent continuous region of an object with inner void areas used to demonstrate the calculation of the ratio of an inner void area to an outer contour area ("void ratio")

An illustrative example of the foregoing variable intensity method is shown in FIG. 11. In step 1096, the object data is read, and the layer thickness is read in step 1098. A solidifiable material identifier (ID) is read in step 1100. The material identifier determines the exposure time $t_e$. System 20 may be operatively associated with a database that relates exposure time $t_e$ values to various materials identified by an identifier ID (e.g., an alpha-numeric string).

The layer index k is initialized to a value of zero (step 1104) and then incremented by one (step 1106). The surface area $S_{ai}$ of each independent continuous region (identified by the index i ranging from 1 to $i_{max}$) in the layer is determined (step 1108). If none of the independent continuous regions has a surface area $S_{ai}$ that exceeds a first threshold $S_{t1}$, the layer is solidified in a continuous mode wherein the build platform 26 continuously moves at a substantially constant speed dz/dt upward along the build (z) axis as the pattern generator 37 projects a pattern of solidification energy corresponding to all of the independent continuous regions for the exposure time $t_e$. The solidification energy is projected at a constant intensity across the layer, and in some examples, at the full intensity of the pattern generator 37. The speed at which the build platform moves dz/dt is the layer thickness $\Delta z$ divided by the exposure time $t_e$. Once the layer is complete (at the end of $t_e$), control transfers to step 1106 to begin another layer.

In step 1110 if at least one of the independent continuous regions in the layer has a surface area $S_{ai}$ which exceeds a first threshold $S_{t1}$ and a slenderness that exceeds a first slenderness threshold $G_t$ or which is less than a first inverse slenderness threshold $G'_t$, variable intensity solidification is used. Although not separately shown in FIG. 11, between steps 1110 and 1114 and additional step is preferably provided for calculating an initial build platform speed dz/dt. In on example, the initial speed dz/dt is a function of the surface area, inverse slenderness, and void ratio of each independent continuous region. In accordance with the example, a build platform speed is determined for each independent continuous region based on these parameters, and the minimum speed determined for all of the independent continuous regions in the layer is used as the initial speed. As mentioned previously, this initial speed may be adjusted to control the planarity of film 33 (FIG. 1B). In one example, a data table much like FIG. 13 is used except that the dead time row $t_{di}$ is replaced with a baseline build platform speed row dz/dt (no dead time is used in this example). After the base line build platform speed is determined (following a value of YES in step 1110), control transfers to step 1114 where the $S_{ai}$ values of each independent continuous region are assigned to bins (ranges of $S_{ai}$ values). The bins are represented as $X_q$ where q=1 to $q_{max}$. Each bin has a plurality of maximum slenderness values, each of which corresponds to a gray scale value $GS_{ai}=f(G_{max}(X_q))$. Thus, for each independent continuous region, the bin $X_q$ to which it belongs and the maximum slenderness value of all regions within that bin will determine the gray scale value used for the region:

$$GS_i = f(G_{max}(X_q) \text{ or } G'_{min}(X_q)) \quad (10)$$

where, $GS_i$ is the gray scale value applied to independent continuous region i;

$X_q$ is the bin to which the independent continuous region i belongs based on its surface area $S_{ai}$;

$G_{max}(X_q)$ is the maximum slenderness value of the bin $X_q$ to which region i belongs for all independent continuous regions i=1 to $i_{max}$ in the layer; and $G'_{min}(X_q)$ is a minimum inverse slenderness value of the bin $X_q$ to which region i belongs for all independent continuous regions i=1 to $i_{max}$ in the layer.

In step 1118, all of the independent continuous regions in the current layer are exposed at an intensity dictated by their gray scale value. A check is made to determine if the last layer has been solidified (step 1120). If it has, the method ends. Otherwise, control transfers to step 1106 and the next layer is processed. The gray scale values GSi are not necessarily the final gray scale values used by the pattern generator. Instead, they are contributions to the final gray scale value for purposes of controlling the dead zone 41. The final gray scale value may have other contributions based on light intensity compensation (i.e., the use of gray scale values to adjust for variations in the incident intensity in the x, y plane) and based on the shape of the part.

In FIG. 11 the gray scale values are step functions of the surface areas of the independent continuous regions and vary with the maximum slenderness value of all the regions i falling within each surface area step. However, each continuous or discrete gray scale value functions could also be determined for each region i based on the region's surface area $S_{ai}$ and slenderness $G_i$.

In certain examples, the value of $GS_i$ for each region may be based on the surface area, inverse slenderness, void ratio, and build platform speed. An example using this technique will now be described.

Example 4

A filled thermoplastic material supplied under the trade name PIC 100c by Envisiontec, Inc. of Dearborn, Mich. is used as the solidifiable material. A DLP® is provided as a pattern generator and includes a light source of 750 mw/$(dm)^2$. The intensity projected onto the solidifiable material will differ and may vary across the build plane based on the use of gray scaling. A layer n−1 includes three independent continuous regions, A, B, and C. Using a table such as that in FIG. 13 (with the total layer exposure time $t_e$ replacing the dead time $t_d$), an entire layer exposure time $t_e$ may be determined based on each individual independent continuous region A-C. Based on the selected layer thickness $\Delta z$, a build platform speed dictated by each individual independent continuous region may be determined, and the minimum speed is selected as the initial build platform speed for the layer n. Using that speed, the surface area of each independent continuous region, the inverse slenderness of each independent continuous region, and the void ratio of each independent continuous region, a gray value for each region GS, may be determined.

Figure 14B:
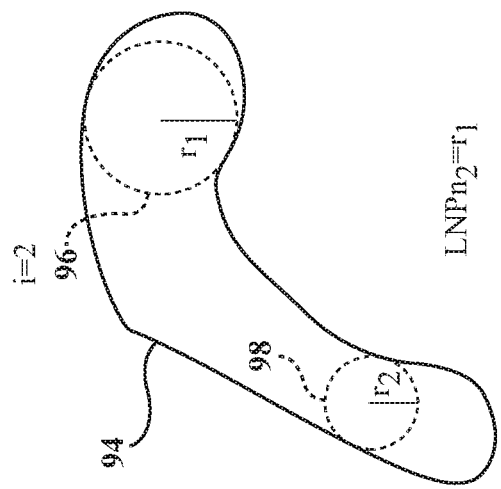
FIG. 14B is a depiction of a second independent continuous region defined by object data for the object layer of FIG. 14A used to illustrate a method of determining the longest minimum path of the second continuous region.
Figure 14A:
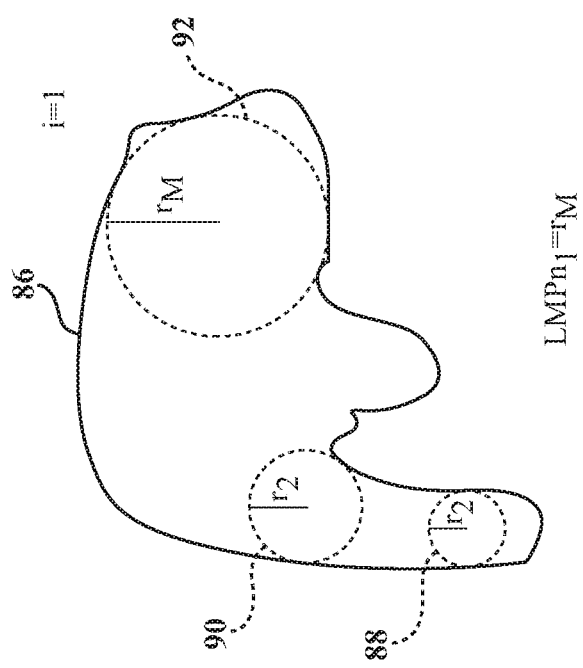
FIG. 14A is a depiction of a first independent continuous region defined by object data for a layer of a three-dimensional object used to illustrate a method of determining the longest minimum path of the region and the layer.

An example table used to determine the build platform speed is shown in FIG. 14A. The table relates the surface area ($S_{ai}$ or $A_i$), inverse slenderness ($G'_i$), and void ratio ($R_i$) to build platform speeds (dz/dt), which are shown as layer thicknesses $\Delta z$ divided by exposure times ($t_e$) for the entire layer (there are no sub-sets separately exposed in this example).

Each region A, B, C will have a build platform speed from FIG. 14A associated with it. The minimum speed will be used to move the build platform from the layer n−1 to n. That minimum speed will be used to select a table from amongst FIGS. 14B-14D and to select from that table the gray scale value GSi for each region, based on the region's surface area, inverse slenderness, and void ratio. As mentioned previously, the gray scale values are preferably partial gray scale values that are combined with gray scale values based on the overlap of the part with a pixel defined by a DLP® mirror and/or a based on light compensation to account for varying intensities in the x-y plane.

Another method of making a three-dimensional object by solidifying a solidifiable material will now be illustrated with reference to FIGS. 14A and 14B. Like the previous methods, a photohardening inhibitor is provided to create a dead zone 41 starting at a surface 27 of the solidifiable material 25 at which the solidification energy is incident.

The method makes use of a geometric parameter called the "longest minimum path" or "LMP" of an independent continuous region. As used herein, the "longest minimum path" refers to the radius of the largest circle that can fit within the independent continuous region. As the LMP of an independent continuous region increases, the speed of movement of fresh resin moving into the gap between the last solidified layer and the building plane 32 increases, which increases the pressure drop at the periphery of the last solidified layer, and thus, the pressure drop between the photo hardening inhibitor 47 and the periphery of the part. An increase in the pressure drop increases the flow rate of the photohardening inhibitor 47 and can increase the size of the dead zone 41 along the build (z) axis.

In accordance with the method, the longest minimum path (LMP) is determined for all i regions in a given object layer n. FIGS. 14A and 14B show two independent continuous regions 86 and 94 with region indices 1 and 2 for a given object layer. In FIG. 14A, three circles 88, 90, and 92 are shown which touch the border of the independent continuous region 86. Any number of circles having the index j=1 to $j_{max}$ may be "drawn" (mathematically, not necessarily graphically) by creating a grid of potential center points within the independent continuous regions and adjusting the radius of circles at each center point until contact is made with the border of the independent continuous region. The largest circle is 92 which has a radius of $r_M$. Thus, the LMP for layer n and i=1 is $r_M$.

In FIG. 14B, two circles 96 and 98 are shown. Circle 96 is the largest circle that can fit within the independent continuous region 94. Thus, its radius $r_1$ is the LMP for layer n and i=2. The LMP for the entire layer is the maximum of the LMP values for all i regions. So, if independent continuous regions 90 and 94 were the only two regions in a layer n, the LMP for the layer would be $r_M$. Thus, the maximum LMP for an independent continuous region i may be expressed as follows:

$$LMP_{ni} = \text{Max}(r_{n,i,j}) \text{ for } j=1 \text{ to } j_{max} \quad (11)$$

where, $LMP_{ni}$=longest minimum path for independent continuous region i $r_{nij}$=radius of the jth circle within the ith independent continuous region of layer n;

i=independent continuous region index;

j=circle index; and n=layer index.

The LMP for the layer n ($LMP_n$) may be expressed as follows:

$$LMP_n = \text{Max}(LMP_{ni}) \text{ for } i=1 \text{ to } i_{max} \quad (12)$$

The dead time $t_d$ for a given layer is a function of the LMP for the layer, i.e., $LMP_n$:

$$t_{dn} = f(LMP_n) \quad (13)$$

A series of exposure times $t_e$, $t_{n1}$, $t_{n2}$ . . . $t_{n\ max}$ is determined for each layer. Each exposure time corresponds to a pattern of solidification energy that may be defined, for example, by a bitmap and which corresponds to one or more of the independent continuous regions in an object layer. The first layer exposure time $t_e$ will be determined as described previously and will constitute all of the independent continuous regions of a layer. Each successive pattern will exclude the next independent continuous region with the lowest longest minimum path (LMP) in that layer, and the exposure time for any given pattern (bitmap) will be determined based on the smallest LMP for any of the remaining independent continuous regions after excluding the next layer in sequence. Thus, referring to FIGS. 14A and 14B, if regions 86 (i=1) and 94 (i=2) are the only two independent continuous regions in layer n, the first exposure will include both regions 86 and 94 for an exposure time $t_e$ (determined as described earlier). The second exposure will include only region 86 and will occur for an exposure time $t_{n1}$. The exposure times may be determined experimentally to create a continuous or discrete function relating exposure times to the smallest longest minimum path LMP remaining in the next pattern (bitmap).

Example 5

The same material, inhibitor chamber 46 pressure, and DLP brightness are used as in Example 2. Oxygen is the inhibitor. The maximum LMP values for a layer and the corresponding values of the dead time $t_d$ and entire layer exposure time $t_e$ are shown in Table 1:

TABLE 1

| LMP (mm) | Delay time td (seconds) | Cumulative exposure time (seconds) |
|---|---|---|
| 0-2.5 | 0 | 6 |
| 2.5-4.5 | 2 | 6 |
| 4.5-7.5 | 3 | 7 |
| 7.5-10 | 4 | 7 |
| 10-15.5 | 6 | 7 |
| >15.5 | 7 | 7.5 |

In using Table 1, if a particular independent continuous region is exposed with smaller regions, the exposure time for the larger region (and those bigger than it) is determined by taking the value in the right hand column and subtracting the previous exposure times determined for regions with smaller LMP values. For example, a largest region having an LMP greater than 15.5 mm will exposed for a cumulative time of 7.5 seconds. However, when that largest region is exposed, the sum of the earlier exposure times generated from the smaller LMP regions will be subtracted from 7.5 seconds so that the cumulative exposure time for the largest LMP region is 7.5 seconds.

For example, layer n−1 includes three independent continuous regions, $A_1$, $A_2$, and $A_3$. $A_1$ has an LMP between 0 and 2.5 mm. $A_2$ has an LMP between 4.5 and 7.5 mm. $A_3$ has an LMP greater than 15.5 mm. The layer n is formed as follows: The build platform 26 moves upward along the build (z) axis for a dead time of 7 seconds (because the maximum LMP for the entire layer is greater than 15.5 mm), during which energy sufficient to solidify the solidifiable material is not projected. Because the smallest region has an LMP of between 0 and 2.5 mm, for an exposure time of 6 seconds ($t_e$), solidification energy is projected for each independent continuous region ($A_1$-$A_3$). Then, for an exposure time of 1 second ($m_1$) solidification energy is projected for independent continuous regions $A_1$ and $A_2$. The 1 second exposure time is obtained by taking the cumulative exposure time for the smaller of $A_1$ and $A_2$ (7 seconds for $A_1$) and subtracting all previous exposure times (6 seconds). For an exposure time of 0.5 seconds, solidification energy is projected for the area $A_3$. This exposure time is obtained by taking the cumulative exposure time for $A_3$ (7.5 seconds) and subtracting the sum of the two previous exposure times (6 seconds+1 second=7 seconds) from 7.5 seconds, yielding 0.5 seconds.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their r equivalents, rather than by the preceding description.

What is claimed is:

1. An apparatus for making a three-dimensional object, comprising:
    a photohardenable material container having an inhibitor-permeable surface that is permeable to a photohardening inhibitor;
    a build platform movable along a build axis relative to the photohardenable material container;
    a source of solidification energy operable to project solidification energy images through the inhibitor-permeable surface;
    at least one controller having a processor and a computer readable memory having instructions stored thereon, wherein when executed by the processor, the instructions cause the at least one controller to adjust at least one of a pressure and a flow rate of the photohardening inhibitor at the inhibitor permeable surface of the photohardenable material container, the build platform, and the source of solidification energy to carry out a method comprising:
        (a) admitting the photohardening inhibitor through a surface of a volume of the photohardenable material;
        (b) continuously moving the build platform along a build axis away from the inhibitor-permeable surface during each period in a first set of consecutive image exposure periods, and during the first set of consecutive image exposure periods, sequentially performing a series of uninterrupted image exposures onto the surface, each image being exposed for one of the periods in the first set of consecutive periods and being representative of a corresponding cross-section of the three-dimensional object;
        (c) discontinuously moving the build platform along the build axis away from the surface during each period in a second set of consecutive image exposure periods, and during each image exposure period of the second set of consecutive image exposure periods, sequentially performing a series of image exposures onto the surface, each image being exposed for one of the periods in the second set of consecutive image exposure periods and being representative of a corresponding cross-section of the three-dimensional object, wherein during the second set of consecutive image exposure periods, the build platform does not move during any of the image exposures, and the build platform moves away from the surface when no image exposure is occurring.

2. The apparatus of claim 1, wherein the method that the instructions cause the at least one controller to carry out is carried out such that when the largest continuous cross-sectional area of the three-dimensional object is at least about 1.5 cm$^2$ the number of periods in the first set of consecutive image exposure periods is no more than 10.

3. The apparatus of claim 1, wherein the method that the instructions cause the at least one controller to carry out is carried out sch that when the largest continuous cross-sectional area of the three-dimensional object is at least about 2.5 cm$^{2}$, the number of periods in the first set of periods does not exceed five.

4. The apparatus of claim 1, wherein in the method that the instructions cause the at least one controller to carry out, during the step of sequentially performing the series of uninterrupted exposures onto the surface during the first set of consecutive image exposure periods, each period in the first set of consecutive image exposure periods has an exposure time comprising an uninterrupted interval during which an image is projected onto the surface of the photohardenable material and a build platform speed, and during the each period in the first set of consecutive image exposure periods, the change in the build platform position between image exposures varies in accordance with the following relationship:

$$\Delta z = (dz/dt) \times (te)$$

wherein, $\Delta z$=change in build platform position between image and during a period in the first set of consecutive image exposure periods (microns, μ);
$dz/dt$=build platform speed along the build axis (μ/sec);
$t_e$=exposure time per image (sec).

5. The apparatus of claim 1, wherein the method that the instructions cause the at least one controller to carry out further comprises carrying out steps (b) and (c) in an alternating sequence while carrying out step (a).

6. The apparatus of claim 4, wherein the method that the instructions cause the at least one controller to carry out is carried out such that the build platform speed is from about 2 mm/sec to about 6 mm/sec.

7. The apparatus of claim 4, wherein the method that the instructions cause the at least one controller to carry out further comprises performing the following steps following each exposure during each consecutive image exposure period in the second set of consecutive image exposure periods: (a) moving the build platform away from the surface by first distance greater than $\Delta z$; then (b) moving the build platform toward the surface by a second distance equal to the first distance less $\Delta z$.

8. The apparatus of claim 7, wherein the method that the instructions cause the at least one controller to carry out is carried out such that the first distance is from about 2$\Delta z$ to about 10$\Delta z$.

9. The apparatus of claim 1, wherein the photohardening inhibitor is oxygen.

10. The apparatus of claim 1, wherein in the method that the instructions cause the at least one controller to carry out, the step of sequentially performing a series of uninterrupted image exposures onto the surface during the first set of periods is carried out by projecting two-dimensional images onto the surface of the photohardenable material.

11. The apparatus of claim 1, wherein the photohardenable material is disposed in a container having a transparent surface that is permeable to the photohardening inhibitor, the volume of the photohardenable material has an upper surface and the lower surface, and the transparent surface that is permeable to the photohardening inhibitor defines the lower surface of the photohardenable material.

12. The apparatus of claim 11, wherein the transparent surface that is permeable to the photohardening inhibitor is a fluoropolymer.

13. The apparatus of claim 11, wherein the container includes a rigid or semi-rigid substrate that is transparent and which is spaced apart along the build axis from the transparent surface that is permeable to the photohardening inhibitor such that a chamber is defined between the rigid or semi-rigid solidification substrate and the transparent surface that is permeable to the photohardening inhibitor.

14. The apparatus of claim 13, wherein the container includes at least one photohardening inhibitor inlet port that discharges into the chamber.

15. The apparatus of claim 13, wherein the chamber is sealed from the atmosphere such that the photohardening inhibitor may only enter the chamber through the at least one photohardening inhibitor port.

16. The apparatus of claim 13, further comprising a displacement sensor for sensing displacement of the transparent surface that is permeable to the photohardening inhibitor and generating a signal corresponding to a degree of displacement of the transparent surface along the build axis, and wherein the method that the instructions cause the at least one controller to carry out further comprises adjusting a pressure of the photohardening inhibitor in the chamber based on the value of the signal.

17. The apparatus of claim 16, wherein the method that the instructions cause the at least one controller to carry out further comprises adjusting a speed of the build platform based on the value of the signal.

18. The apparatus of claim 11, further comprising a rigid or semi-rigid transparent substrate and a film comprising the transparent surface that is permeable to the photohardening inhibitor, wherein the film is laminated to the substrate, and the film has a plurality of channels through which the photohardening inhibitor flows from an edge portion of the film through an upper surface of the film during the step of admitting the photohardening inhibitor through a surface of a volume of the photohardenable material.

19. The apparatus of claim 18, wherein the film comprises a polydimethylsiloxane.

20. The apparatus of claim 1, wherein the method that the instructions cause the at least one controller to carry out further comprises controlling the temperature of the photohardening inhibitor.

* * * * *

UNITED STATES PATENT AND TRADEMARK OFFICE
CERTIFICATE OF CORRECTION

PATENT NO. : 11,413,856 B2  
APPLICATION NO. : 16/920509  
DATED : August 16, 2022  
INVENTOR(S) : Ali El-Siblani and Mohamad Janbain Page 1 of 1

It is certified that error appears in the above-identified patent and that said Letters Patent is hereby corrected as shown below:

In the Claims

Column 26, Line 67, Claim 3 between "out" and "that" delete "sch" and insert --such--

Signed and Sealed this  
Thirteenth Day of September, 2022

Katherine Kelly Vidal  
*Director of the United States Patent and Trademark Office*